(12) United States Patent
Tagami

(10) Patent No.: US 7,215,502 B2
(45) Date of Patent: May 8, 2007

(54) MAGNETIC RECORDING AND REPRODUCING APPARATUS WITH TRAPEZIODAL WRITE POLE TIP TO AVOID OVERWRITING ADJACENT TRACKS

(75) Inventor: Katsumichi Tagami, Tokyo (JP)

(73) Assignee: TDK Corporation, Tokyo (JP)

( * ) Notice: Subject to any disclaimer, the term of this patent is extended or adjusted under 35 U.S.C. 154(b) by 95 days.

(21) Appl. No.: 11/136,372

(22) Filed: May 25, 2005

(65) Prior Publication Data

US 2006/0066984 A1 Mar. 30, 2006

(30) Foreign Application Priority Data

Sep. 29, 2004 (JP) .............................. 2004-283368

(51) Int. Cl.
*G11B 5/187* (2006.01)
(52) U.S. Cl. .................... 360/77.08; 360/122; 360/126; 360/135
(58) Field of Classification Search ................ None
See application file for complete search history.

(56) References Cited

U.S. PATENT DOCUMENTS

| | | | | |
|---|---|---|---|---|
| 5,995,341 | A | 11/1999 | Tanaka et al. | 360/125 |
| 6,504,675 | B1 | 1/2003 | Shukh et al. | 360/125 |
| 6,707,643 | B2 * | 3/2004 | Takeo et al. | 360/125 |
| 6,710,973 | B2 | 3/2004 | Okada et al. | 360/125 |
| 6,813,116 | B2 | 11/2004 | Nakamura et al. | 360/125 |
| 6,952,325 | B2 * | 10/2005 | Sato et al. | 360/125 |
| 2002/0182443 | A1 * | 12/2002 | Ohkubo | 428/694 SG |
| 2004/0042118 | A1 * | 3/2004 | Notsuke et al. | 360/126 |
| 2004/0150910 | A1 | 8/2004 | Okada et al. | 360/125 |

FOREIGN PATENT DOCUMENTS

| | | |
|---|---|---|
| JP | 3-181016 | 8/1991 |
| JP | 9-7158 | 1/1997 |
| JP | 2002-92821 | 3/2002 |
| JP | 2003-242607 | 8/2003 |

\* cited by examiner

*Primary Examiner*—Hoa T. Nguyen
*Assistant Examiner*—James L Habermehl
(74) *Attorney, Agent, or Firm*—Oblon, Spivak, McClelland, Maier & Neustadt, P.C.

(57) ABSTRACT

A magnetic recording and reproducing apparatus includes a magnetic head having a main magnetic pole, a magnetic recording medium of a discrete type having a predetermined convex-concave structure at data tracks and servo tracks, and a drive device body that can operate to rotationally drive the magnetic recording medium in a constant direction and cause the magnetic head to be movable in substantially radial directions of the magnetic recording medium. A relationship among parameters specifying a predetermined convex-concave shape of the data track, parameters specifying the main magnetic pole, and a skew angle is defined by a predetermined inequality. By setting a specification of the magnetic recording and reproducing apparatus in the range defined by the inequality, it is possible to prevent unwanted writing into the adjacent track to thereby realize high-density recording having extremely high reliability.

21 Claims, 11 Drawing Sheets

MEDIUM MOVING DIRECTION

MAGNETIC RECORDING AND REPRODUCING APPARATUS WITH TRAPEZIODAL WRITE POLE TIP TO AVOID OVERWRITING ADJACENT TRACKS

BACKGROUND OF THE INVENTION

1. Field of the Invention

The present invention relates to a magnetic recording and reproducing apparatus comprising a magnetic head having a main magnetic pole, a magnetic recording medium, and a drive device body that can operate to rotationally drive the magnetic recording medium in a constant direction and cause the magnetic head to be movable in radial directions of the magnetic recording medium. The magnetic recording medium concerns a magnetic recording medium of a so-called discrete type in which a perpendicular magnetic recording layer is formed on a substrate so as to be divided into many recording elements in a predetermined convex-concave pattern.

2. Description of the Related Art

Improvement in areal recording density of magnetic recording mediums such as hard disks has conventionally been achieved by techniques of both (1) improving the linear recording density and (2) improving the track density. In order to achieve further and higher densification in future, it is necessary to improve the areal recording density based on the foregoing both techniques.

With respect to improving the track density, there have been raised problems of processing limitation about magnetic heads, side-fringe or crosstalk caused by expansion of magnetic fields of magnetic heads, and so forth, and therefore, it can be said that the improvement in areal recording density by progressing the track-density increasing technique for magnetic heads, which is merely an extension of the conventional improvement technique, has reached the limit.

On the other hand, as a technique of improving the linear recording density, reduction in layer thickness and higher coercive forces have been achieved in conventional longitudinal magnetic mediums. However, in terms of further and higher densification of the mediums and stability of recording magnetization against thermal fluctuation, attention has been paid to perpendicular magnetic recording mediums.

Under these circumstances, as a technique of improving the areal recording density and supplementing the higher track densification of the magnetic heads, there have been proposed magnetic recording mediums of a discrete track disk type in which a recording layer is formed in a predetermined convex-concave pattern. For example, JP-A-H11-328662 discloses a magnetic recording medium in which predetermined convex and concave portions are formed on a substrate in advance and a perpendicular magnetic recording layer in the form of a single layer is formed along the convex and concave portions.

In general, a magnetic recording medium used in a magnetic disk drive has data areas (data tracks) for recording data information and servo areas (servo tracks) for recording tracking servo information and, in the case of a discrete medium, these track groups are formed as a plurality of recording elements divided in a predetermined convex-concave pattern.

The servo area generally includes an ISG (Initial Signal Gain) portion, an SVAM (SerVo Address Mark) portion, a Gray code portion, a burst portion, and a pad portion which are in the form of various magnetic patterns for exhibiting predetermined functions, respectively. Generally, in the servo area, a magnetic field is applied perpendicularly so as to carry out magnetization collectively.

On the other hand, in the perpendicular magnetic recording layer of the data area (data track), magnetic recording is carried out by a magnetic field generated in a perpendicular direction from a main magnetic pole of a perpendicular magnetic head.

A rotary actuator is normally used for driving a magnetic head. In a magnetic recording and reproducing apparatus having such a rotary actuator, assuming that, when recording/reproducing inner and outer recording tracks (data tracks) of a disk-shaped magnetic recording medium, an angle formed between a flat surface of a recording/reproducing element of the magnetic head and a plane perpendicular to a circumferential direction of a data track is defined as a skew angle and it is set to zero at a particular track, a skew angle inevitably occurs at any of the other tracks. For example, assuming that a skew angle is set to zero at an innermost data track of a disk-shaped magnetic recording medium, a maximum skew angle occurs at an outermost data track of the disk-shaped magnetic recording medium.

U.S. Pat. No. 5,995,341 discloses a technique that determines a relationship among the shape of a main magnetic pole of a magnetic head, a skew angle, a track pitch, and so on in a perpendicular magnetic recording system. This patent uses a perpendicular magnetic recording medium being a general medium not applied with discrete processing and having a continuous magnetic recording surface, specifies the shape of a tip of the main magnetic pole in cross-section as a quadrangular shape, and determines the relationship among the skew angle, the track pitch, and so on when performing magnetic recording with respect to the medium by the use of the main magnetic pole of the perpendicular magnetic head.

According to the technique disclosed in U.S. Pat. No. 5,995,341, however, although the condition is set so as to prevent the tip of the main magnetic pole having the quadrangular cross-section from overwriting in an adjacent data track, when the skew angle occurs, the writing corresponding to the skew angle is carried out in the adjacent track and, in the case of the maximum skew angle, there is no guard band so that an unwanted signal generated by bits recorded therein becomes a noise source of crosstalk. Therefore, it can be said that it is substantially impossible to effectively use the disclosed technique in the magnetic recording apparatus with such a structure. Further, this prior art is not intended for discrete mediums and a formula itself proposed therein is not applicable to discrete mediums.

In order to avoid such a problem, U.S. Pat. No. 6,504,675, JP-A-2002-92821, JP-A-2003-242607, and so on each disclose a method that uses a magnetic head having a main magnetic pole with an inverted trapezoidal cross-section and controls a recording track width so as to provide a guard band even when a skew angle occurs.

However, it is not possible to apply those disclosed techniques as they are to discrete mediums. Further, it has not yet reached the state where a substantial effect is achieved only by those disclosed techniques.

The present invention has been made under these circumstances and has an object to provide a magnetic recording apparatus that, in a mutual relationship between a discrete medium (discrete track disk) having a predetermined convex-concave structure at data tracks and servo tracks and a magnetic head having a main magnetic pole for perpendicular magnetic recording, can prevent unwanted writing into the adjacent track to thereby realize the high-density recording having extremely high reliability.

SUMMARY OF THE INVENTION

For accomplishing the foregoing object, according to one aspect of the present invention, there is obtained a magnetic recording and reproducing apparatus comprising a magnetic head having at least a main magnetic pole, a magnetic recording medium, and a drive device body that can operate to rotationally drive the magnetic recording medium in a constant direction and cause the magnetic head to be movable in substantially radial directions of the magnetic recording medium, wherein the magnetic recording medium has data tracks for recording data information and servo tracks for recording tracking servo information, the magnetic recording medium being a discrete medium in which groups of the tracks are formed as a plurality of recording elements divided in a predetermined convex-concave pattern, the data tracks and the servo tracks of the magnetic recording medium are formed by convex-portion perpendicular magnetic recording layers and a section of each of the convex-portion perpendicular magnetic recording layers in a track width direction (track radial direction) has a trapezoidal shape, an outline shape of the main magnetic pole at an air bearing surface of the magnetic head is a shape that is continuously reduced in width from its trailing end located on a downstream side of a rotation direction of the magnetic recording medium toward its leading end located on an upstream side thereof, the magnetic recording medium and the magnetic head are in a relationship of disposition such that the main magnetic pole causes skew angles θ with respect to circumferential directions of at least some of the data tracks of the magnetic recording medium, and given that a data track pitch of the magnetic recording medium is Tp, a width of an upper surface of each of the convex-portion perpendicular magnetic recording layers of the data tracks is Tw, a width of the trailing end of the main magnetic pole in the magnetic head is W1, a width of the leading end of the main magnetic pole in the magnetic head is W2, a thickness (length in a track circumferential direction) of the main magnetic pole in the magnetic head is t, an inclination angle of the trapezoidal shape of the section of each of the convex-portion perpendicular magnetic recording layers in the track width direction (track radial direction) is η, and a thickness of each of the convex-portion perpendicular magnetic recording layers is δ, a relationship of an inequality (1) is satisfied when, as a precondition, a relationship among θ, W1, W2, and t satisfies a condition of θ>tan$^{-1}$(W1−W2)/2·t, the inequality (1) given as $Tp-Tw \geq (t^2+(W1-W2)^2/4)^{1/2} \cdot \sin\{\theta-\tan^{-1}(W1-W2)/2t\}+2\delta/\tan \eta$.

As a preferred mode of the present invention, it is configured such that a soft magnetic layer for assisting a magnetic field in a perpendicular direction is provided under the data tracks and the servo tracks formed by the convex-portion perpendicular magnetic recording layers.

As a preferred mode of the present invention, it is configured such that a recording magnetic field generated by the main magnetic pole of the magnetic head passes through the corresponding convex-portion perpendicular magnetic recording layer and serves to perform perpendicular magnetic recording in the corresponding convex-portion perpendicular magnetic recording layer, and then returns to an auxiliary magnetic pole through the soft magnetic layer.

As a preferred mode of the present invention, it is configured such that the outline shape of the main magnetic pole at the air bearing surface of the magnetic head is a trapezoidal shape that is continuously reduced in width from its trailing end located on the downstream side of the rotation direction of the magnetic recording medium toward its leading end located on the upstream side thereof.

As a preferred mode of the present invention, it is configured such that when a maximum skew angle is given as θmax, a condition of an inequality (1-2) is satisfied as a precondition, the inequality (1-2) given as $2Tp-Tw-2\Delta W \geq W1 \geq (Tw+2\Delta W)/\cos \theta\text{max}$ where $\Delta W = \delta/\tan \eta$.

According to another aspect of the present invention, there is obtained a magnetic recording and reproducing apparatus comprising a magnetic head having at least a main magnetic pole, a magnetic recording medium, and a drive device body that can operate to rotationally drive the magnetic recording medium in a constant direction and cause the magnetic head to be movable in substantially radial directions of the magnetic recording medium, wherein the magnetic recording medium has data tracks for recording data information and servo tracks for recording tracking servo information, the magnetic recording medium being a discrete medium in which groups of the tracks are formed as a plurality of recording elements divided in a predetermined convex-concave pattern, the data tracks and the servo tracks of the magnetic recording medium are formed by convex-portion perpendicular magnetic recording layers and a section of each of the convex-portion perpendicular magnetic recording layers in a track width direction (track radial direction) has a trapezoidal shape, an outline shape of the main magnetic pole at an air bearing surface of the magnetic head comprises a first quadrangular portion extending with a constant width from its trailing end located on a downstream side of a rotation direction of the magnetic recording medium toward an upstream side thereof, and a second quadrangular portion that is continuous with the first quadrangular portion and is continuously reduced in width toward its leading end located on a further upstream side, the magnetic recording medium and the magnetic head are in a relationship of disposition such that the main magnetic pole causes skew angles θ with respect to circumferential directions of at least some of the data tracks of the magnetic recording medium, and given that a data track pitch of the magnetic recording medium is Tp, a width of an upper surface of each of the convex-portion perpendicular magnetic recording layers of the data tracks is Tw, a width of the trailing end of the first quadrangular portion of the main magnetic pole in the magnetic head is W1, a thickness (length in a track circumferential direction) of the first quadrangular portion is t1, a width of the leading end of the second quadrangular portion of the main magnetic pole in the magnetic head is W2, a thickness (length in the track circumferential direction) of the second quadrangular portion is t2, an inclination angle of the trapezoidal shape of the section of each of the convex-portion perpendicular magnetic recording layers in the track width direction (track radial direction) is η, and a thickness of each of the convex-portion perpendicular magnetic recording layers is δ, a relationship of an inequality (2) is satisfied when, as a precondition, a relationship among θ, W1, W2, and t2 satisfies a condition of θ>tan$^{-1}$(W1−W2)/2·t2, the inequality (2) given as $$Tp-Tw \geq (t2^2+(W1-W2)^2/4)^{1/2} \cdot \sin\{θ-\tan^{-1}(W1-W2)/2t2\}+t1 \cdot \sin θ+2δ/\tan η.$$

As a preferred mode of the present invention, it is configured such that the second quadrangular portion in the outline shape of the main magnetic pole at the air bearing surface of the magnetic head has a trapezoidal shape that is continuously reduced in width from the downstream side of the rotation direction of the magnetic recording medium toward its leading end located on the upstream side thereof.

As a preferred mode of the present invention, it is configured such that when a maximum skew angle is given as θmax, a condition of an inequality (1-2) is satisfied as a precondition, the inequality (1-2) given as $$2Tp-Tw-2\Delta W \geq W1 \geq (Tw+2\Delta W)/\cos θ\text{max}$$

where $\Delta W = δ/\tan η$.

According to another aspect of the present invention, there is obtained a magnetic recording and reproducing apparatus comprising a magnetic head having at least a main magnetic pole, a magnetic recording medium, and a drive device body that can operate to rotationally drive the magnetic recording medium in a constant direction and cause the magnetic head to be movable in substantially radial directions of the magnetic recording medium, wherein the magnetic recording medium has data tracks for recording data information and servo tracks for recording tracking servo information, the magnetic recording medium being a discrete medium in which groups of the tracks are formed as a plurality of recording elements divided in a predetermined convex-concave pattern, the data tracks and the servo tracks of the magnetic recording medium are formed by convex-portion perpendicular magnetic recording layers and a section of each of the convex-portion perpendicular magnetic recording layers in a track width direction (track radial direction) has a trapezoidal shape, an outline shape of the main magnetic pole at an air bearing surface of the magnetic head comprises a first quadrangular portion extending with a constant width from its trailing end located on a downstream side of a rotation direction of the magnetic recording medium toward an upstream side thereof, and a second quadrangular portion that is continuous with the first quadrangular portion and is continuously reduced in width toward its leading end located on a further upstream side, the magnetic recording medium and the magnetic head are in a relationship of disposition such that the main magnetic pole causes skew angles θ with respect to circumferential directions of at least some of the data tracks of the magnetic recording medium, and given that a data track pitch of the magnetic recording medium is Tp, a width of an upper surface of each of the convex-portion perpendicular magnetic recording layers of the data tracks is Tw, a width of the trailing end of the first quadrangular portion of the main magnetic pole in the magnetic head is W1, a thickness (length in a track circumferential direction) of the first quadrangular portion is t1, a width of the leading end of the second quadrangular portion of the main magnetic pole in the magnetic head is W2, a thickness (length in the track circumferential direction) of the second quadrangular portion is t2, an inclination angle of the trapezoidal shape of the section of each of the convex-portion perpendicular magnetic recording layers in the track width direction (track radial direction) is η, and a thickness of each of the convex-portion perpendicular magnetic recording layers is δ, a relationship of an inequality (2) is satisfied when, as a precondition, a relationship among θ, W1, W2, and t2 satisfies a condition of θ<tan$^{-1}$(W1−W2)/2·t2, the inequality (3) given as $$Tp-Tw \geq t1 \cdot \sin θ+2δ/\tan η.$$

As a preferred mode of the present invention, it is configured such that the second quadrangular portion in the outline shape of the main magnetic pole at the air bearing surface of the magnetic head has a trapezoidal shape that is continuously reduced in width from the downstream side of the rotation direction of the magnetic recording medium toward its leading end located on the upstream side thereof.

As a preferred mode of the present invention, it is configured such that when a maximum skew angle is given as θmax, a condition of an inequality (1-2) is satisfied as a precondition, the inequality (1-2) given as $$2Tp-Tw-2\Delta W \geq W1 \geq (Tw+2\Delta W)/\cos θ\text{max}$$

where $\Delta W = δ/\tan η$.

As a preferred mode of the present invention, it is configured such that the inclination angle η of the trapezoidal shape of the section of each of the convex-portion perpendicular magnetic recording layers in the track width direction (track radial direction) falls within the angular range of 50 to 85 degrees.

As a preferred mode of the present invention, it is configured such that the magnetic recording medium is the discrete medium in which the data tracks for recording the data information and the servo tracks for recording the tracking servo information are formed as the plurality of recording elements divided in the predetermined convex-concave pattern and concave portions are filled with a nonmagnetic material for causing a discrete operation to be exhibited.

A magnetic recording and reproducing apparatus of the present invention is a magnetic recording and reproducing apparatus comprising a magnetic head having a main magnetic pole, a magnetic recording medium of a discrete type having a predetermined convex-concave structure at data tracks and servo tracks, and a drive device body that can operate to rotationally drive the magnetic recording medium in a constant direction and cause the magnetic head to be movable in substantially radial directions of the magnetic recording medium, wherein, by defining a relationship among parameters specifying a predetermined convex-concave shape of the data track, parameters specifying the main magnetic pole, and a skew angle, it is possible to prevent unwanted writing into the adjacent track to thereby realize the high-density recording having extremely high reliability.

DETAILED DESCRIPTION OF THE INVENTION

Hereinbelow, the best mode for carrying out the present invention will be described in detail.

A magnetic recording and reproducing apparatus of the present invention comprises a magnetic head having at least a main magnetic pole, a magnetic recording medium, and a drive device body that can operate to rotationally drive the magnetic recording medium in a constant direction and cause the magnetic head to be movable in substantially radial directions of the magnetic recording medium.

At the outset, an example of a schematic structure of the magnetic recording and reproducing apparatus will be described with reference to FIG. 6 in order to understand the overall structure of the apparatus.

Figure 6:
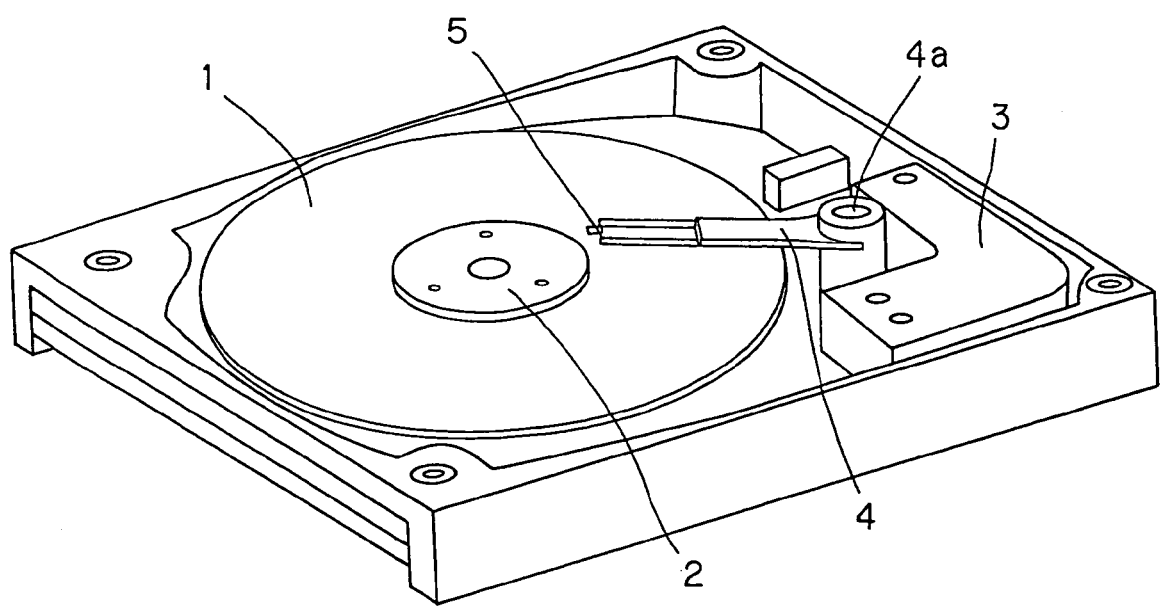
FIG. 6 is a schematic perspective view of a magnetic recording and reproducing apparatus.
Figure 7:
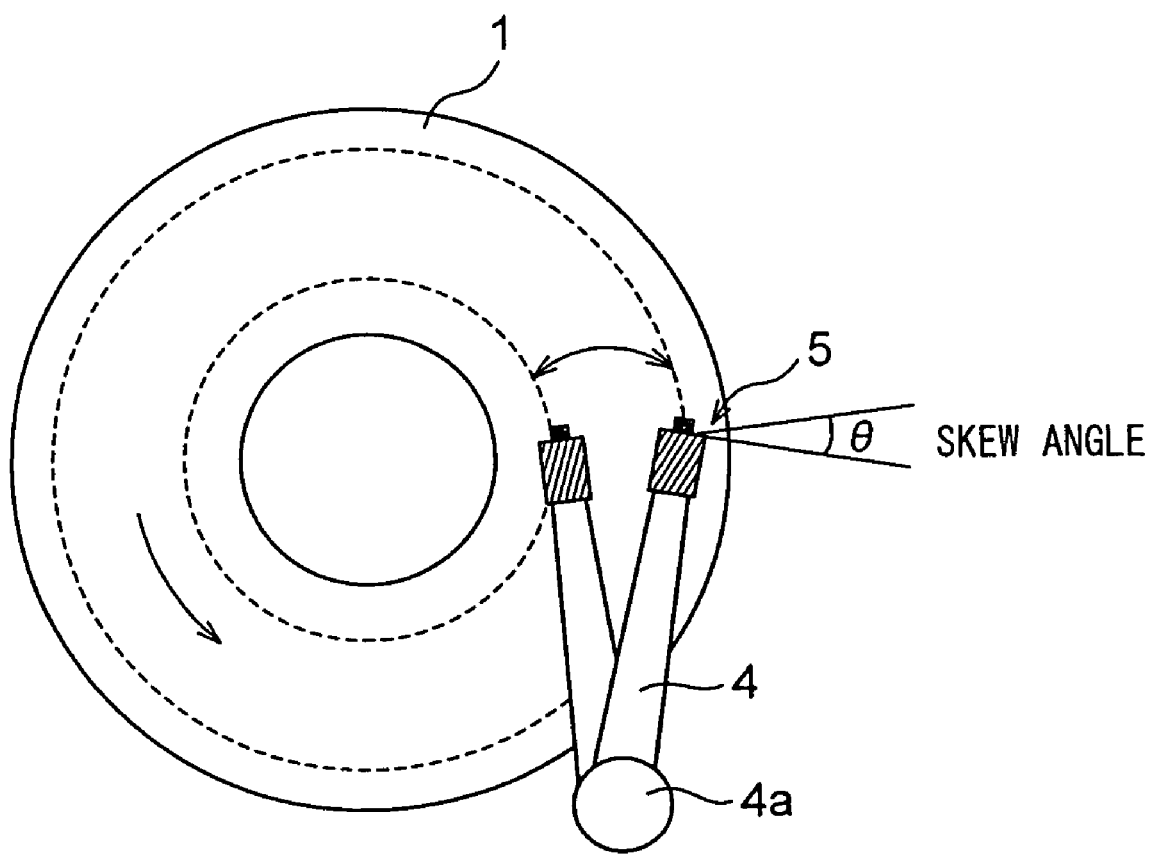
FIG. 7 is a schematic plan view showing the main part of the magnetic recording and reproducing apparatus.

Description of Example of Schematic Structure of Magnetic Recording and Reproducing Apparatus FIG. 6 is a perspective view showing a schematic structure of the magnetic recording and reproducing apparatus being one preferred example of the present invention. FIG. 7 is a plan view showing the main part extracted for explaining the main part of FIG. 6. In FIG. 6, a magnetic recording medium 1 is a disk-shaped perpendicular magnetic recording medium and is rotationally driven by a spindle motor 2.

Further, in order to read and write data with respect to the magnetic recording medium, a recording and reproducing magnetic head 5 is provided at the tip of a swing arm 4 extending radially inward toward the center of the medium from its outer peripheral side.

The swing arm 4 is swung by a voice coil motor 3 with a rotary actuator 4a serving as a reference point so that, for example, the magnetic head 5 can be positioned at a given track based on servo signals detected by the magnetic head 5. The drive systems such as the spindle motor 2 and the voice coil motor 3 are included in the drive device body.

The magnetic head 5 normally has a recording element and a reproducing element. A single-pole head of a main-pole excitation type, for example, is used as the recording element, while, a GMR (Giant MagnetoResistance effect) head, for example, is used as the reproducing element. A TMR (Tunneling MagnetoResistance effect) head or the like may be used instead of the GMR head.

It is ideal that the recording element (or the reproducing element) of the magnetic head carries out a recording operation (or a reproducing operation) in the state where it is arranged straight along a circumferential direction of a data track without deviating from the track. However, actually, since the magnetic head is attached to the tip of the swing arm 4 that swings with the rotary actuator 4a serving as the reference point, a skew angle $\theta$ indicative of a position offset of the magnetic head occurs with respect to a plane perpendicular to a circumferential direction of a certain data track.

As described before, when, for example, a skew angle $\theta$ being an angle defined with respect to a plane perpendicular to a circumferential direction of a particular data track is set to zero, a skew angle $\theta$ inevitably occurs at any of the other tracks. Assuming that a skew angle $\theta$ is set to zero at an innermost data track of a disk-shaped magnetic recording medium, a maximum skew angle $\theta$max occurs at an outermost data track of the disk-shaped magnetic recording medium.

Description of Magnetic Recording Medium

Now, the structure of the magnetic recording medium will be described.

Figure 1:
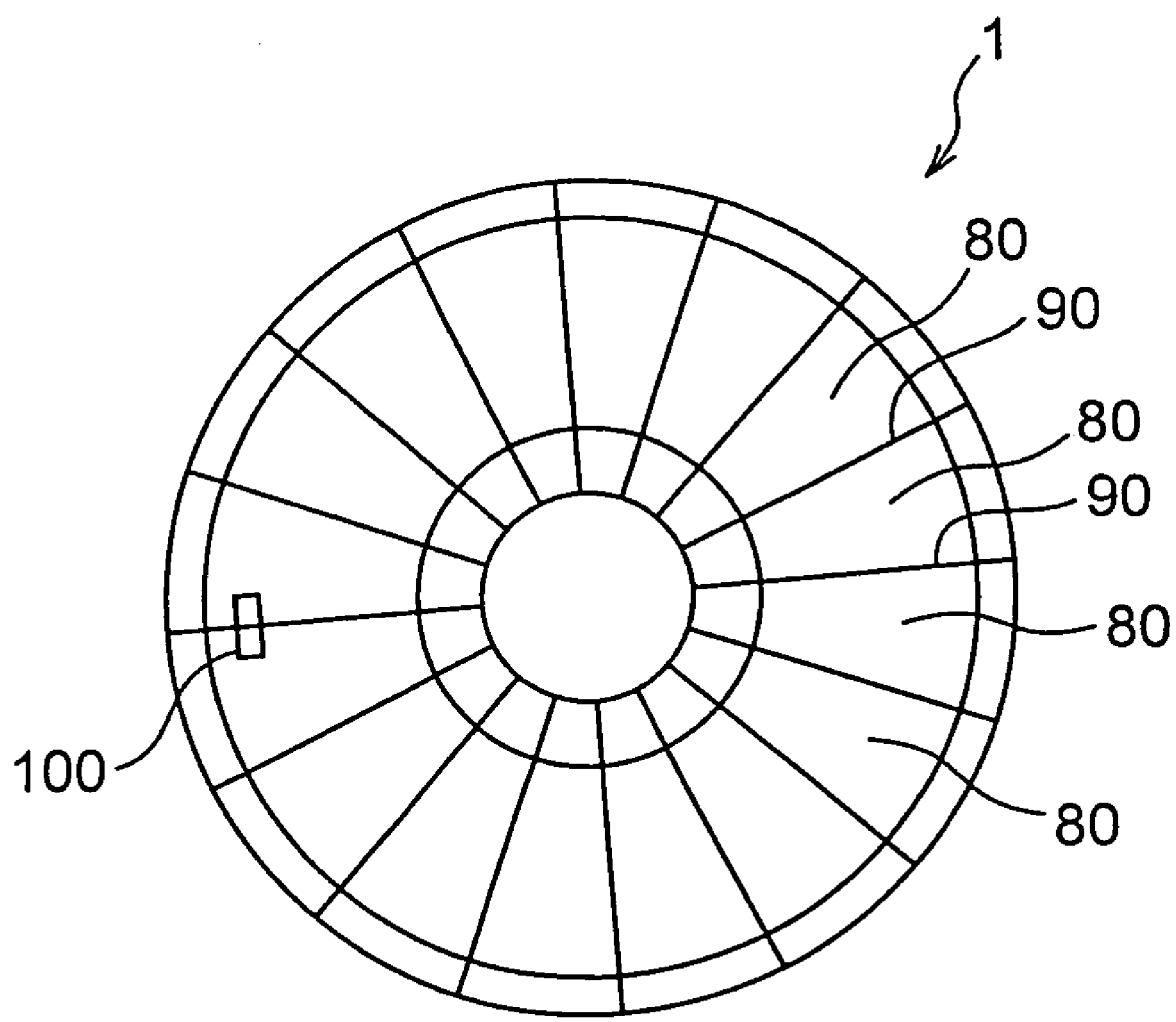
FIG. 1 is a schematic plan view showing an overall shape of a disk-shaped magnetic recording medium of the present invention.
Figure 2:
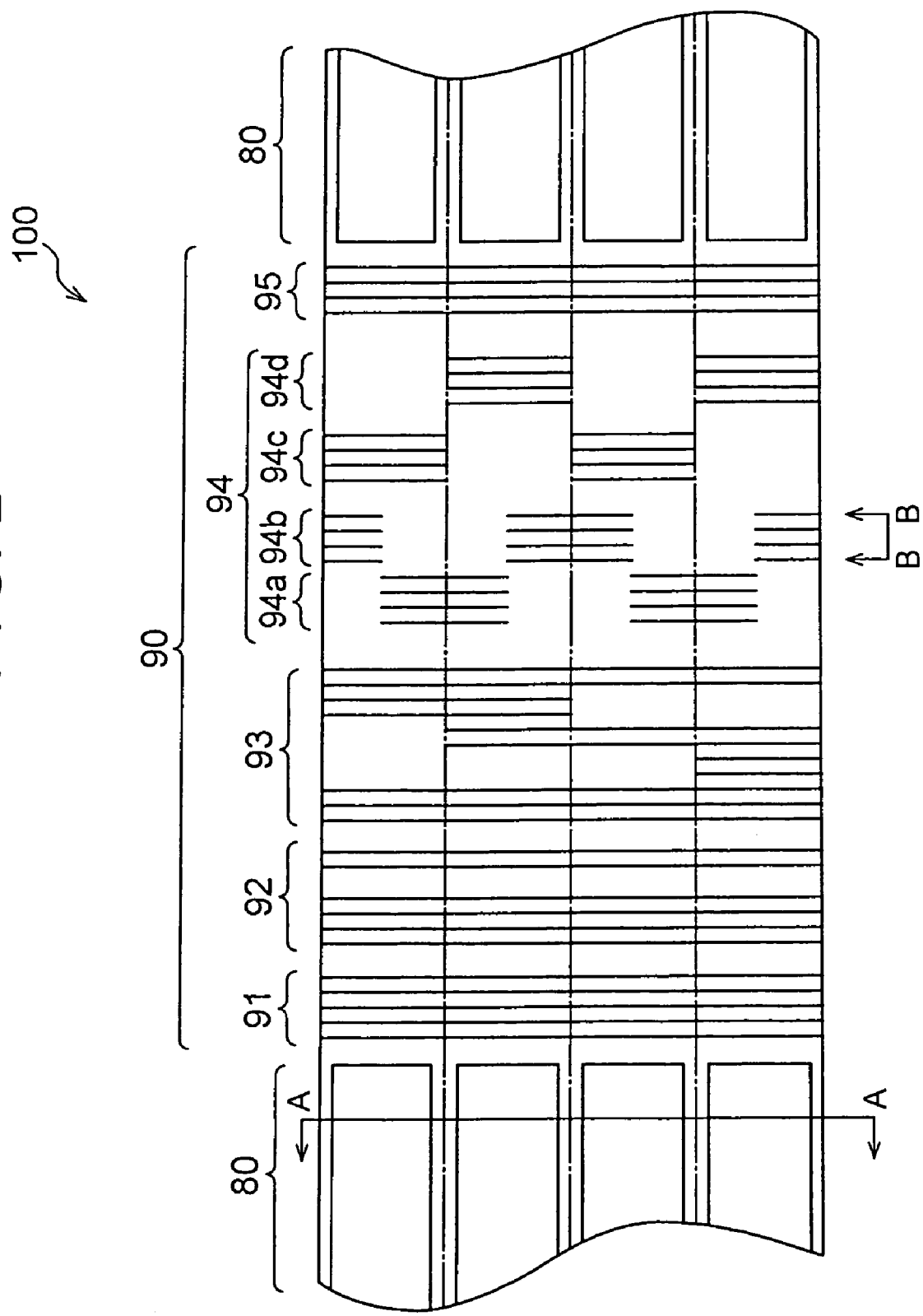
FIG. 2 is an enlarged schematic view of a small portion surrounded by a rectangle in FIG. 1.

FIG. 1 is a schematic plan view showing the overall shape of the disk-shaped magnetic recording medium 1 used in the present invention, and FIG. 2 is an enlarged schematic view of a small portion 100 surrounded by a rectangle in FIG. 1. FIG. 2 conceptually illustrates mainly servo information portions 90 each being an area where servo signals are recorded, and data information recording portions 80 each in the form of a group of data tracks for recording and reproduction. The data information recording portion 80 includes data tracks 80 arranged concentrically (or spirally), while the servo information portion 90 includes a plurality of servo tracks 90 arranged in a predetermined manner.

Figure 3:
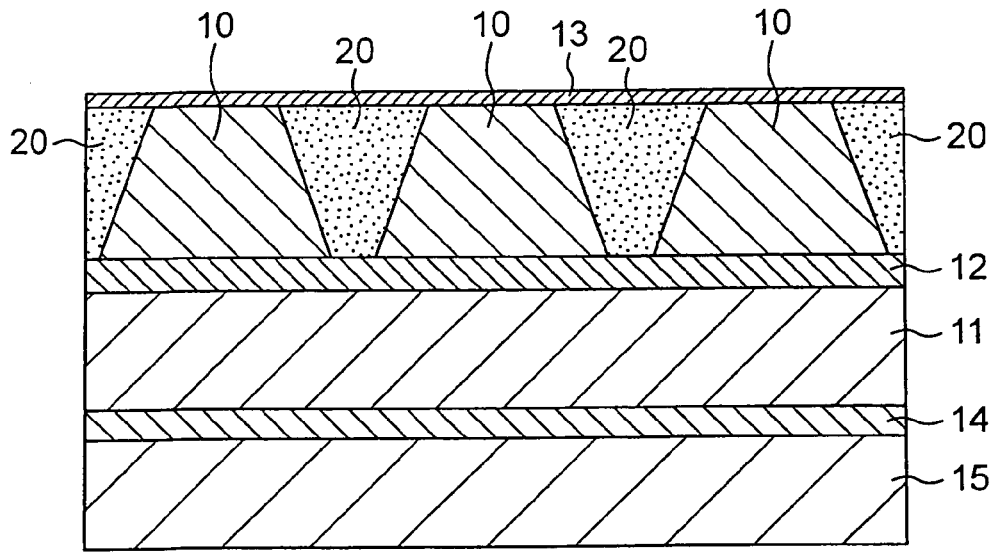
FIG. 3 is a sectional view conceptually showing a preferred embodiment of the magnetic recording medium of the present invention.

FIG. 3 is a sectional view conceptually illustrating a preferred embodiment of the magnetic recording medium (particularly paying attention to the data tracks) in the present invention. FIG. 3 substantially corresponds to a sectional view taken along line A—A in FIG. 2.

In FIG. 1, although not illustrated, a plurality of data track groups for recording and reproduction are concentrically disposed/formed on a disk substrate.

Further, servo signal regions (servo information portions 90: those portions drawn as radial lines in FIG. 1) are radially formed extending outward from the center of the disk. That is, a so-called sector servo system is employed wherein the disk surface is divided into sectors. Servo information is recorded in each of the servo information portions 90 of the magnetic recording medium by a servo track writer.

The structure of the servo information portion 90 will be described. As shown in FIG. 2, the servo information portion 90 (so-called servo area) comprises an ISG (Initial Signal Gain) portion 91, an SVAM (SerVo Address Mark) portion 92, a Gray code portion 93, a burst portion 94, and a pad portion 95. The burst portion 94 is in the form of patterns for providing precise position information necessary for the magnetic head to perform accurate tracking to the track position. These patterns are normally composed of a combination of first bursts 94a and second bursts 94b each equally straddling a center line that defines the track pitch between the adjacent tracks and a combination of third bursts 94c and fourth bursts 94d each located at a position offset from the first and second bursts by half the track pitch.

Referring now to FIG. 3, description will be given about an example of a preferred section structure of the magnetic recording medium. As the basic section structure, both the data tracks and the servo tracks employ substantially the same discrete track structure. The present invention mainly concerns a relationship between the data tracks and a main magnetic pole of the magnetic head. Therefore, the structure around the data tracks is shown as the sectional view of FIG. 3 and FIG. 3 can be understood as, for example, the sectional view taken along line A—A in FIG. 2. Note that a sectional view taken along line B—B in FIG. 2 is similar in structure to the sectional view of FIG. 3 and therefore the structure around the servo tracks can be imaged as a sectional view by the use of FIG. 3.

As shown in FIG. 3, the magnetic recording medium comprises a substrate 15, an orientation layer 14 formed on the substrate 15, a soft magnetic layer 11 formed on the orientation layer 14, an intermediate layer 12 formed on the soft magnetic layer 11, perpendicular magnetic recording layers 10 and nonmagnetic layers 20 corresponding to convex portions and concave portions, respectively, of the convex-concave shape formed on the intermediate layer 12, and a protective layer 13 formed on the layers 10 and 20. The concave-portion nonmagnetic layers 20 may reach the inside of the soft magnetic layer 11.

As the substrate 15, use is preferably made of a glass substrate, an NiP-coated aluminum alloy substrate, an Si substrate, or the like. As the orientation layer 14, use can be made of, for example, an antiferromagnetic material such as PtMn for applying an anisotropic magnetic field to the soft magnetic layer 11 in the track width direction. Alternatively, use may be made of a nonmagnetic alloy for controlling the orientation.

As the soft magnetic layer 11, there can be cited a CoZrNb alloy, an Fe-based alloy, a Co-based amorphous alloy, a soft magnetic/nonmagnetic multilayer film, soft magnetic ferrite, or the like.

The intermediate layer 12 is provided for controlling a perpendicular magnetic anisotropy and a crystal grain size of the perpendicular magnetic recording layers 10 formed on the intermediate layer 12, and Ru or a CoTi nonmagnetic alloy, for example, is used therefor. Alternatively, use may be made of a nonmagnetic metal, an alloy, or a low-permeability alloy that works similarly.

As the convex-portion perpendicular magnetic recording layer (data track) 10, use is preferably made of a medium in which ferromagnetic grains of CoPt or the like are contained in a matrix in an $SiO_2$ oxide-based material, a CoCr-based alloy, an FePt alloy, a Co/Pd-based artificial lattice type multilayer alloy, or the like.

As a material of the concave-portion nonmagnetic layer 20, use is made of a nonmagnetic oxide such as $SiO_2$, $Al_2O_3$, $TiO_2$, or ferrite, a nitride such as AlN, or a carbide such as SiC.

Normally, the protective layer 13 in the form of a carbon thin film or the like is formed on the surfaces of the convex-portion perpendicular magnetic recording layers (data tracks) 10 and the nonmagnetic layers 20 filled in the concave portions by the use of the CVD method or the like.

The formation of the perpendicular magnetic recording layers (data tracks) 10 and the nonmagnetic layers 20 based on the convex-concave pattern (the formation of the so-called discrete type medium) is carried out by, for example, etching a perpendicular magnetic recording layer, formed in a constant thickness, into a predetermined convex-concave shape, then sputtering $SiO_2$ corresponding to an etching depth to fill etched concave portions. Thereafter, $SiO_2$ excessively deposited on the perpendicular magnetic recording layers (data tracks) is removed by applying oblique ion-beam etching or the like while rotating the medium, thereby flattening the whole surface of the medium.

Figure 4:
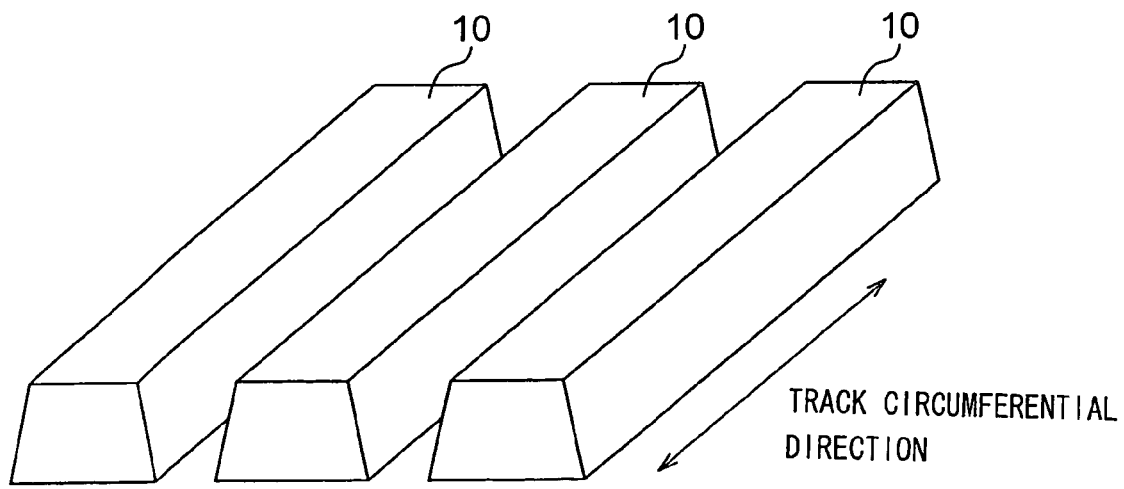
FIG. 4 is a schematic perspective view showing a structure of perpendicular magnetic recording layers (data tracks) each having a trapezoidal shape in cross-section.

FIG. 4 is a schematic perspective view exemplarily showing only the convex-portion perpendicular magnetic recording layers (data tracks) 10. Each of the convex-portion perpendicular magnetic recording layers (data tracks) 10 extends in the track circumferential direction. Further, a section of the convex-portion perpendicular magnetic recording layer (data track) 10 in the track radial direction (i.e. a section obtained by cutting the convex-portion perpendicular magnetic recording layer (data track) 10 in the track radial direction) has a trapezoidal shape in the present invention. The reason for this and so on will be described later.

Figure 5:
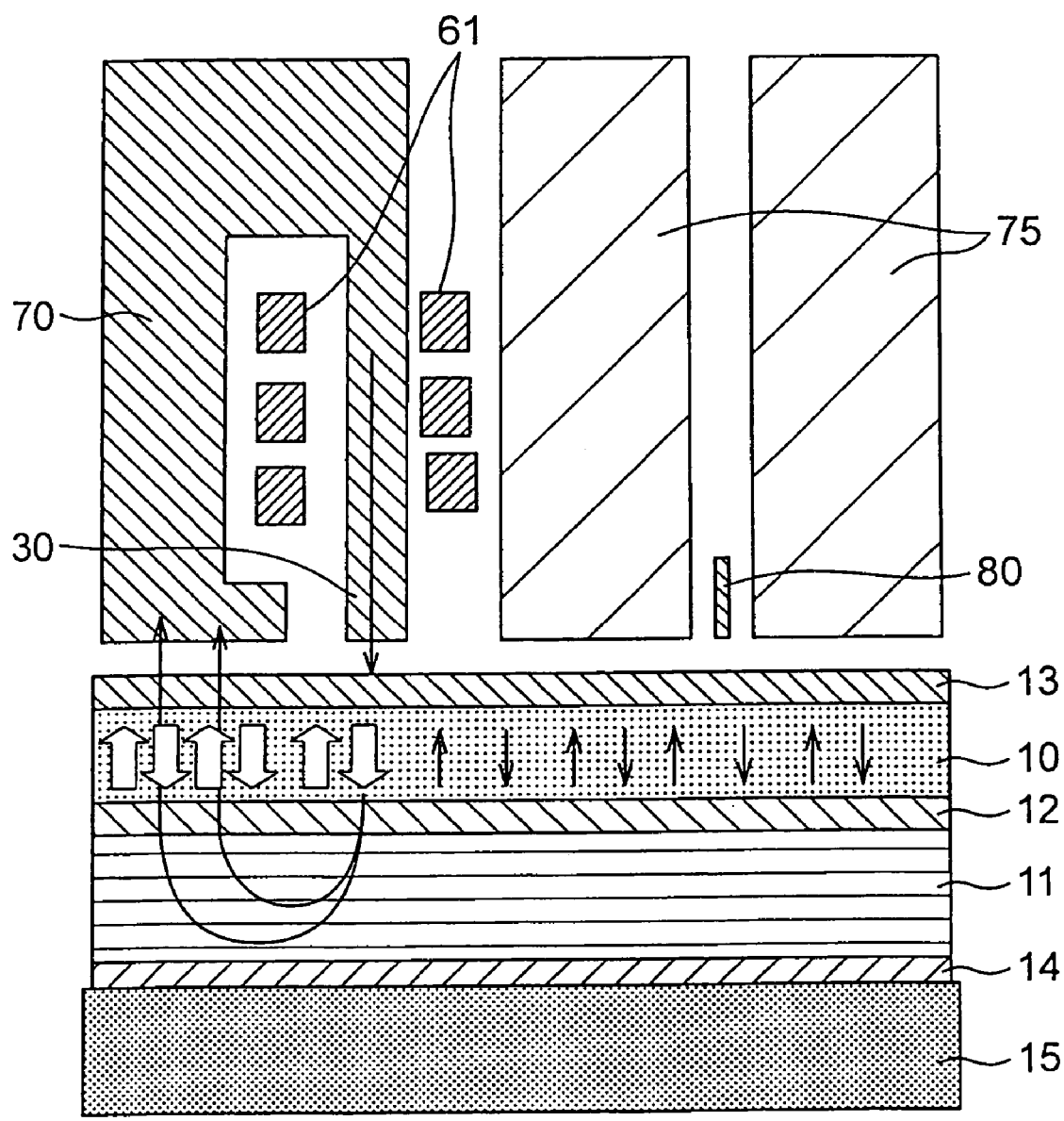
FIG. 5 is a perspective view for briefly explaining a mechanism when perpendicular magnetic recording is performed using a single-pole (with a single main pole) magnetic head with respect to a perpendicular magnetic recording medium.

Prior to describing the main part of the present invention, description will be briefly given, referring to FIG. 5, of a mechanism of perpendicular magnetic recording using a single-pole (with a single main pole) magnetic head with respect to a perpendicular magnetic recording medium. FIG. 5 shows the state where the single-pole head is disposed right above the data track in a confronting manner, and is a sectional view obtained by cutting them in the track circumferential direction wherein symbols, assigned to the magnetic recording medium, which are the same as those shown in FIG. 3 represent the same components.

In FIG. 5, when current is supplied to a coil 61 of the magnetic head to excite it, a magnetic field in a perpendicular direction is generated between the tip of a main magnetic pole 30 and the soft magnetic layer 11 of the medium so that magnetic recording in the perpendicular direction is carried out in the convex-portion perpendicular magnetic recording layer (data track) 10. The magnetic flux having flowed through the soft magnetic layer 11 of the medium returns to an auxiliary magnetic pole 70 so that a magnetic circuit is formed.

In the example of FIG. 5, a GMR element 80 for reading recorded magnetic data is disposed between shield layers 75 and 75.

During the magnetic recording operation by the main magnetic pole 30, the distribution of recording magnetization is mainly determined by the shape of the main magnetic pole 30. In order to realize the high-density recording having extremely high reliability, which is the object of the present invention, it is necessary to set an optimal relationship that can securely prevent unwanted writing into the adjacent track in consideration of parameters such as the shape of the main magnetic pole 30, the shape of the convex-portion perpendicular magnetic recording layer (data track) 10, and the skew angle θ.

Hereinbelow, setting of optimal specifications will be described in turn by showing three modes.

Description of Optimal Setting in First Mode

Figure 8:
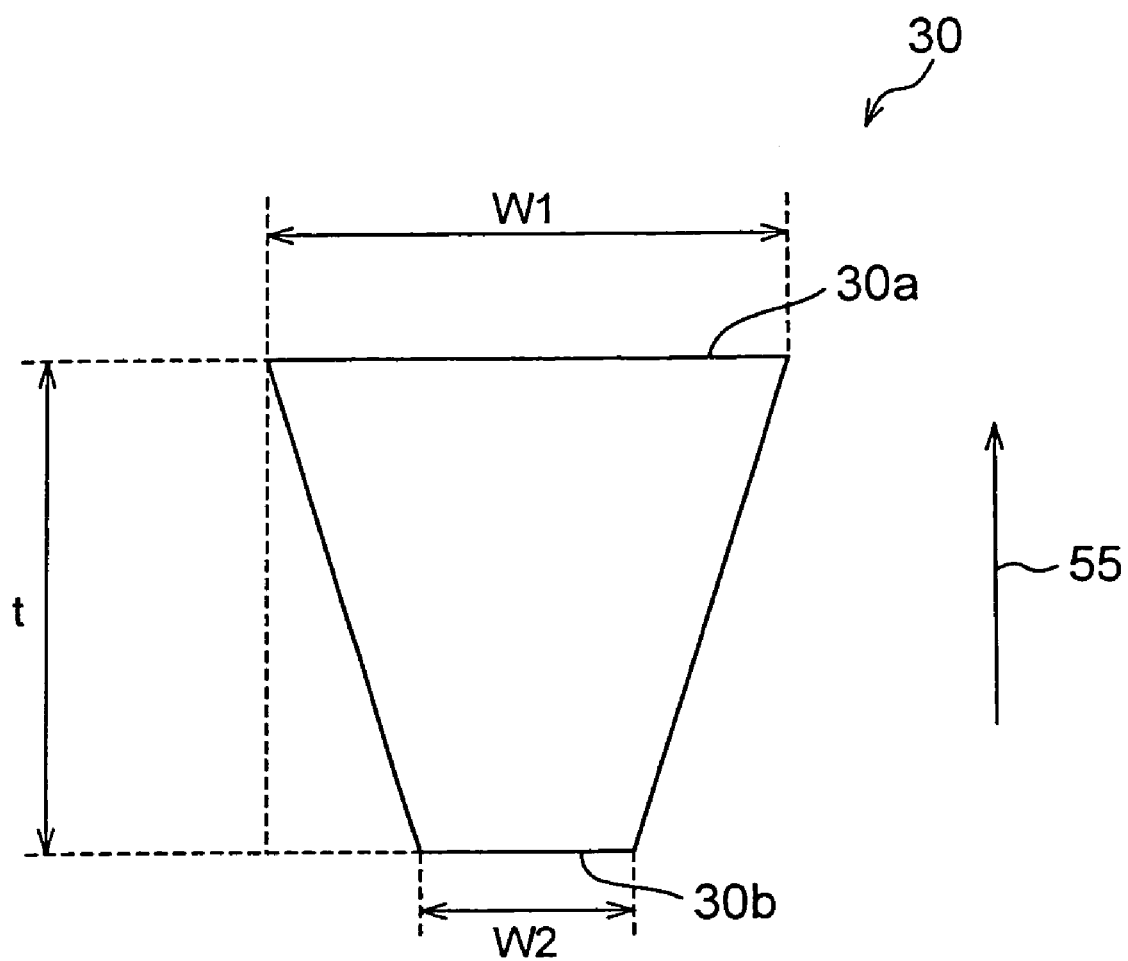
FIG. 8 is a diagram showing an outline shape of a main magnetic pole at an air bearing surface of a magnetic head.

FIG. 8 shows an outline shape of a main magnetic pole 30 at an air bearing surface of a magnetic head and, more specifically, shows the outline shape of the main magnetic pole 30 when the magnetic head is seen from the magnetic recording medium side.

The rotation direction of a disk-shaped magnetic recording medium (so-called disk rotation direction) is identified by an arrow 55 directed upward from the lower side in FIG. 8. Therefore, the outline shape of the main magnetic pole 30 shown in FIG. 8 is a shape that is continuously reduced in width from a trailing end 30a having a width W1 and located on the downstream side of the rotation direction of the magnetic recording medium toward a leading end 30b having a width W2 and located on the upstream side and the preferred shape shown in FIG. 8 is an (inverted) trapezoidal shape. The thickness (length in the track circumferential direction) of the main magnetic pole 30 in the magnetic head is set to t.

Figure 9A:
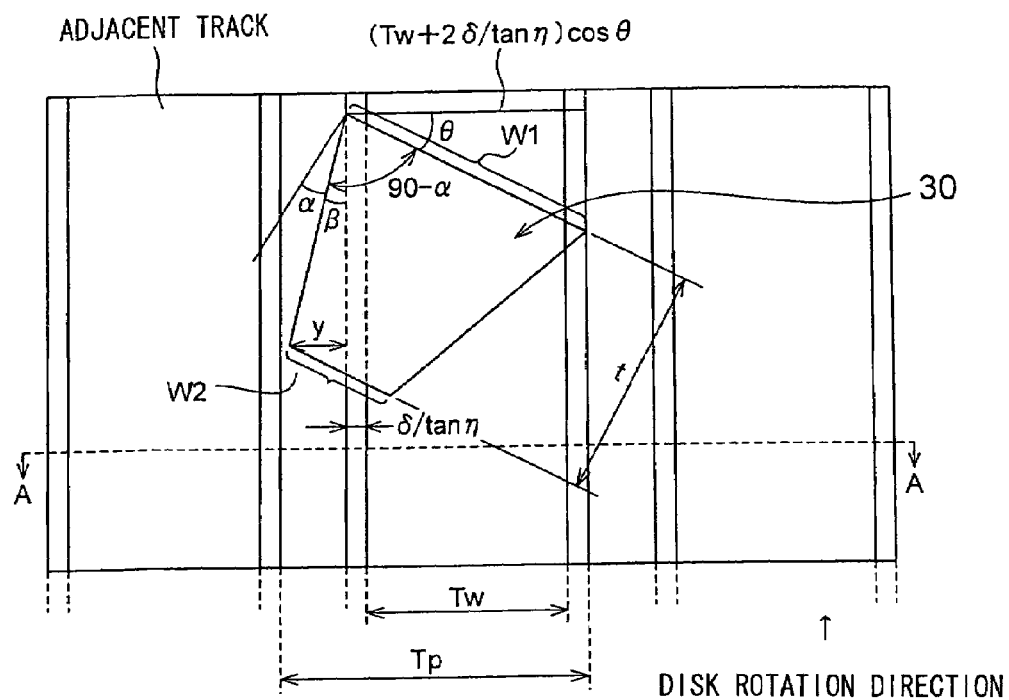
FIG. 9(A) is a diagram showing a positional relationship between an outline shape of a magnetic pole and convex-portion perpendicular recording layers (data tracks) in a planar fashion and FIG. 9(B) is a sectional view taken along line A—A in FIG. 9(A), wherein sections of the perpendicular magnetic recording layers (data tracks) are substantially shown.
Figure 9B:
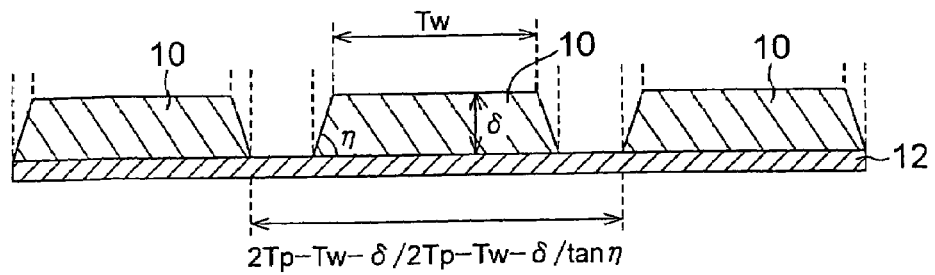

FIG. 9(A) is a diagram showing a positional relationship between the outline shape of the main magnetic pole 30 and convex-portion perpendicular recording layers (data tracks) 10 in a planar fashion. FIG. 9(B) is a sectional view taken along line A—A in FIG. 9(A), wherein sections of the perpendicular magnetic recording layers (data tracks) 10 are substantially shown (illustration of nonmagnetic layers 20 is omitted).

As shown in FIG. 9(A), the convex-portion perpendicular magnetic recording layers (data tracks) 10 and the main magnetic pole 30 are in a relationship of disposition such that the main magnetic pole 30 causes skew angles θ with respect to circumferential directions of at least some of the data tracks of the magnetic recording medium. Herein, the data track pitch of the magnetic recording medium is given as Tp and the width of an upper surface of the convex-portion perpendicular magnetic recording layer (data track) 10 is given as Tw.

Particularly, in FIG. 9(A), there is shown the state where the leading end 30b with the width W2 of the main magnetic pole 30 contacts a side edge of the adjacent data track due to the skew angle θ. If the main magnetic pole 30 displaces more to the adjacent data track side, information on the adjacent data track is erased, which is thus not preferable. Therefore, the skew angle θ is limited to a maximum value where one end of the main magnetic pole contacts the adjacent data track as shown in FIG. 9(A).

Further, as shown in FIG. 9(B), the convex-portion perpendicular magnetic recording layer (data track) 10 in the present invention is configured such that a section thereof in the track width direction (track radial direction) has a trapezoidal shape with a larger width at its lower part, wherein the inclination angle of the trapezoidal shape is given as η and the thickness of the convex-portion perpendicular magnetic recording layer is given as δ.

In the perpendicular magnetic recording model of the present invention based on the parameter setting as described above, it is necessary to satisfy an inequality (1) below in order to prevent unwanted writing into the adjacent track to thereby realize the high-density recording having extremely high reliability.

$$Tp-Tw \geq (t^2+(W1-W2)^2/4)^{1/2} \cdot \sin\{\theta-\tan^{-1}(W1-W2)/2t\}+2\delta/\tan\eta \quad (1)$$

The basic idea in deriving the inequality (1) is as follows.

(i) When the skew angle θ occurs, the corner of the leading end 30b enters an area of the nonmagnetic layer 20 so that the main magnetic pole 30 partly protrudes from the data track as shown in FIG. 9(A). In this event, given that the protruding distance into the area of the nonmagnetic layer 20 is y, the condition where this protruding distance y does not interfere with the adjacent data track is defined as Tp−Tw−2ΔW≧y where ΔW=δ/tan η.

(ii) In FIG. 9(A), the protruding distance y is expressed as y=(t²+(W1−W2)²/4)^{1/2}·sin β while α=tan⁻¹(W1−W2)/2t and β=θ−α. Therefore, by eliminating y, β, and α, the foregoing inequality (1), i.e.

$$Tp-Tw \geq (t^2+(W1-W2)^2/4)^{1/2} \cdot \sin\{\theta-\tan^{-1}(W1-W2)/2t\}+2\delta/\tan\eta,$$

is obtained.

Further, as a precondition, it is necessary that a relationship among θ, W1, W2, and t satisfy a condition of θ>tan⁻¹(W1−W2)/2·t. Unless this condition is satisfied, the track protruding portion toward the adjacent track side does not exist so that there arises no problem to be solved by the present invention.

Further, since the trailing end 30a should not interfere with the adjacent data track while it basically extends over the data track width even when the skew angle θ occurs, it is necessary that W1 maintain a relationship of 2Tp−Tw−2ΔW≧W1≧(Tw+2ΔW)/cos θmax as a precondition.

In this inequality, it is desirable that W1 be set to 0.9 times and preferably 0.8 times an upper limit value (2Tp−Tw−2ΔW) in consideration of servo position error displacement.

θmax represents the maximum skew angle. Further, as described above, there is the relationship of ΔW=δ/tan η.

As described above, in the present invention, the section of the convex-portion perpendicular magnetic recording layer (data track) 10 in the track width direction (track radial direction) has the trapezoidal shape with its lower side longer than its upper side. It is desirable that the inclination angle η of the trapezoidal shape be set in the range of 50 to 85 degrees, preferably 65 to 85 degrees, and more preferably 70 to 80 degrees. When the inclination angle η becomes less than 50 degrees, there tends to occur a disadvantage that a recording surface with respect to a recording magnetic field from the main magnetic pole increases and an influence of recording from the adjacent track increases so that the noise increases. On the other hand, when the inclination angle η exceeds 85 degrees, there tends to occur a disadvantage that it becomes difficult to exhibit an operation of absorbing servo position error displacement on an oblique surface of the data track for buffering.

Description of Optimal Setting in Second Mode

Figure 10:
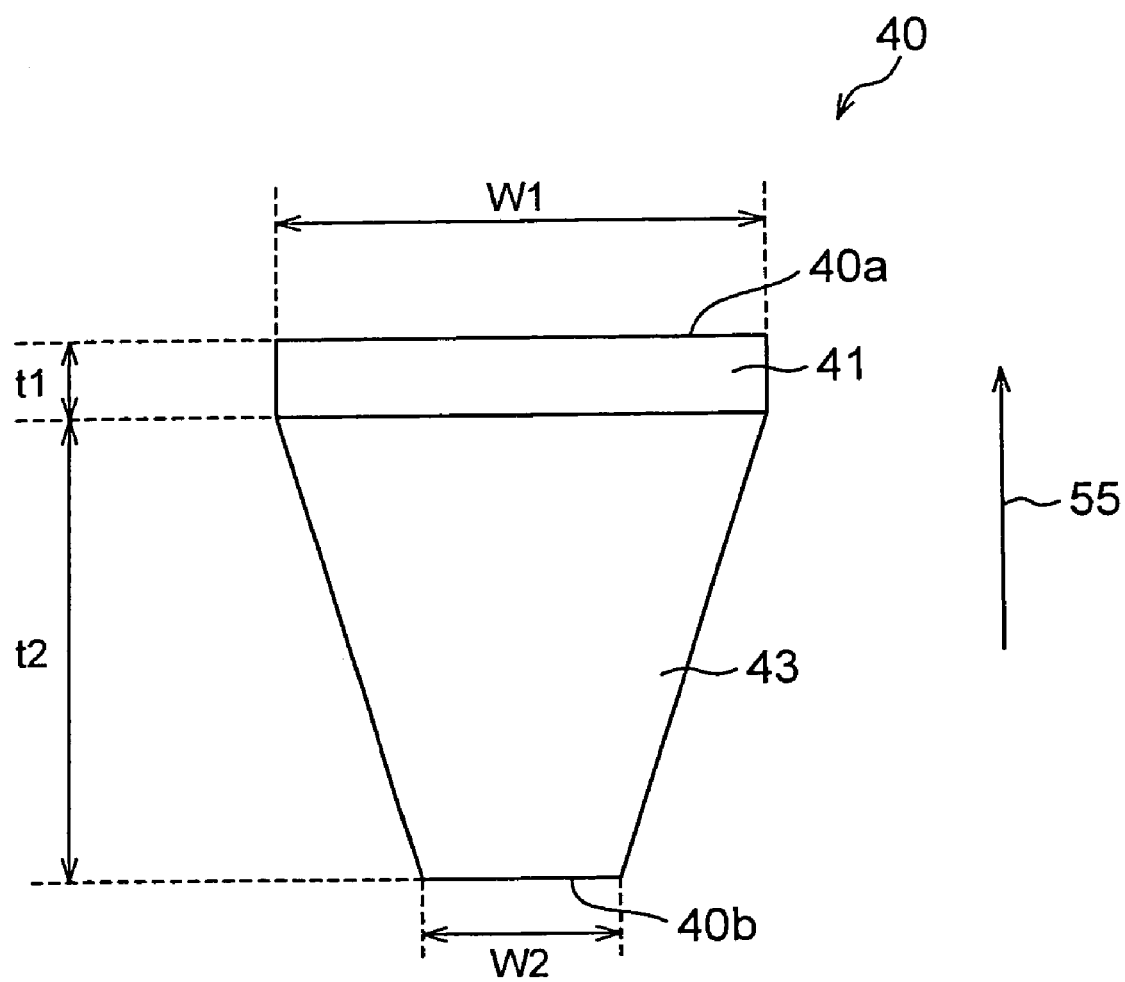
FIG. 10 is a diagram showing an outline shape of a main magnetic pole at an air bearing surface of a magnetic head.

FIG. 10 shows an outline shape of another preferred main magnetic pole 40 at an air bearing surface of a magnetic head and, more specifically, shows the outline shape of the main magnetic pole 40 when the magnetic head is seen from the magnetic recording medium side.

The rotation direction of a disk-shaped magnetic recording medium (so-called disk rotation direction) is identified by an arrow 55 directed upward from the lower side in FIG. 10. The outline shape of the main magnetic pole 40 shown in FIG. 10 comprises a first quadrangular portion 41 extending with a constant width from a trailing end 40a having a width W1 and located on the downstream side of the rotation direction of the magnetic recording medium toward the upstream side, and a second quadrangular portion 43 that is continuous with the first quadrangular portion 41 and is continuously reduced in width toward a leading end 40*b* having a width W2 and located on the further upstream side.

As shown in FIG. 10, the first quadrangular portion 41 has a rectangular shape having the width W1 and a thickness (length in the track circumferential direction) t1. On the other hand, the second quadrangular portion 43 shown in FIG. 10 has an (inverted) trapezoidal shape having a thickness t2 and continuously reduced in width as approaching from a connection portion (width W1) continuous with the first quadrangular portion 41 toward the leading end 40*b* with the width W2 located on the upstream side.

Figure 11A:
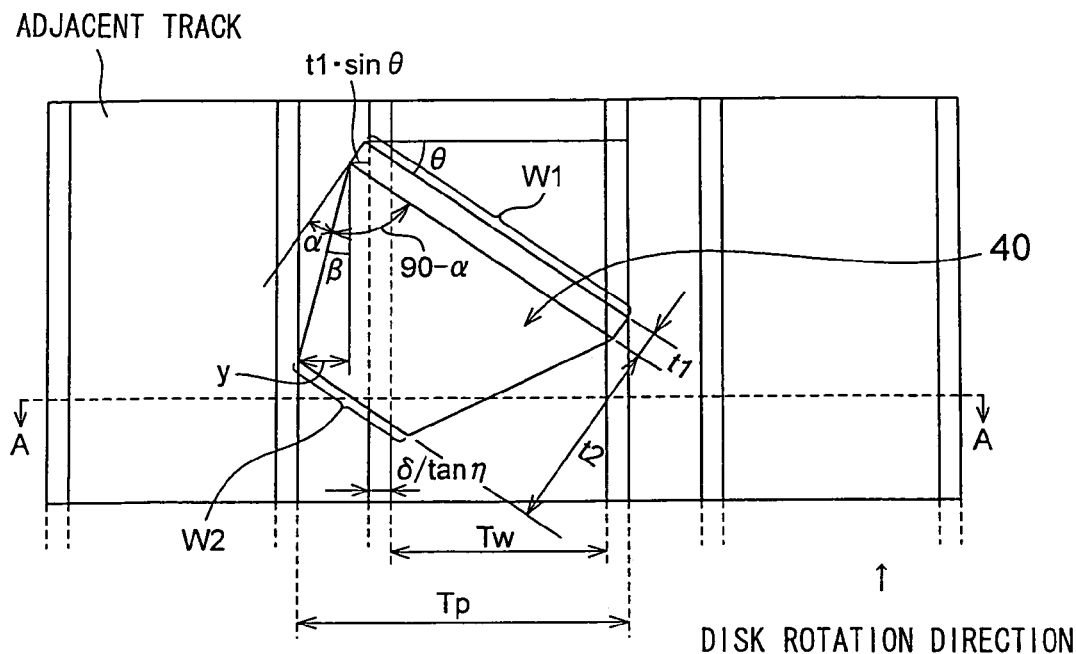
FIG. 11(A) is a diagram showing a positional relationship between an outline shape of a magnetic pole and convex-portion perpendicular recording layers (data tracks) in a planar fashion and FIG. 11(B) is a sectional view taken along line A—A in FIG. 11(A), wherein sections of the perpendicular magnetic recording layers (data tracks) are substantially shown.
Figure 11B:
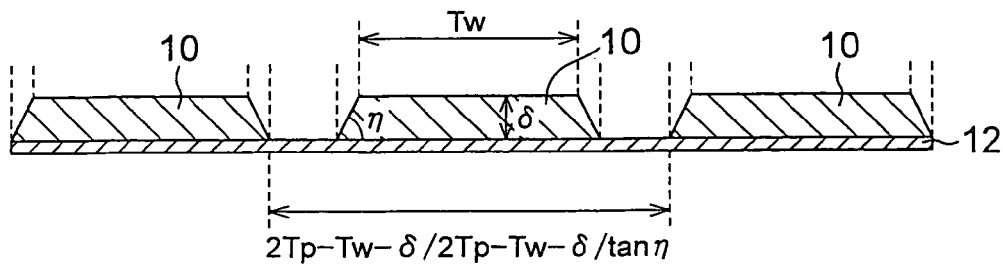

FIG. 11(A) is a diagram showing a positional relationship between the outline shape of the main magnetic pole 40 and convex-portion perpendicular recording layers (data tracks) 10 in a planar fashion. FIG. 11(B) is a sectional view taken along line A—A in FIG. 11(A), wherein sections of the perpendicular magnetic recording layers (data tracks) 10 are substantially shown.

As shown in FIG. 11(A), the convex-portion perpendicular magnetic recording layers (data tracks) 10 and the main magnetic pole 40 are in a relationship of disposition such that the main magnetic pole 40 causes skew angles θ with respect to circumferential directions of at least some of the data tracks of the magnetic recording medium. Herein, the data track pitch of the magnetic recording medium is given as Tp and the width of an upper surface of the convex-portion perpendicular magnetic recording layer (data track) 10 is given as Tw.

Further, as shown in FIG. 11(B), the convex-portion perpendicular magnetic recording layer (data track) 10 in the present invention is configured such that a section thereof in the track width direction (track radial direction) has a trapezoidal shape with a larger width at its lower part, wherein the inclination angle of the trapezoidal shape is given as η and the thickness of the convex-portion perpendicular magnetic recording layer is given as δ.

In the perpendicular magnetic recording model of the present invention based on the parameter setting as described above, it is necessary to satisfy an inequality (2) below in order to prevent unwanted writing into the adjacent track to thereby realize the high-density recording having extremely high reliability.

$$Tp-Tw \geq (t2^2+(W1-W2)^2/4)^{1/2} \cdot \sin\{\theta-\tan^{-1}(W1-W2)/2t2\}+t1 \cdot \sin\theta+2\delta/\tan\eta \quad (2)$$

The basic idea in deriving the inequality (2) is as follows.

(i) When the skew angle θ occurs, the corner of the leading end 40*b* enters an area of the nonmagnetic layer 20 so that the main magnetic pole 40 partly protrudes from the data track as shown in FIG. 11(A). In this event, the protruding distance into the area of the nonmagnetic layer 20 becomes y+t1·sin θ. Therefore, the condition where this protruding distance y+t1·sin θ does not interfere with the adjacent data track is defined as Tp−Tw−2ΔW≧y+t1·sin θ where ΔW=δ/tan η.

(ii) The distance y is expressed as y=(t2²+(W1−W2)²/4)^{1/2}·sin β while α=tan⁻¹(W1−W2)/2t and β=θ−α. Therefore, by eliminating y, β, and α, the foregoing inequality (2), i.e.

$$Tp-Tw \geq (t2^2+(W1-W2)^2/4)^{1/2} \cdot \sin\{\theta-\tan^{-1}(W1-W2)/2t2\}+t1 \cdot \sin\theta+2\delta/\tan\eta, \text{ is obtained.}$$

Further, as a precondition, it is necessary that a relationship among θ, W1, W2, and t2 satisfy a condition of θ>tan⁻¹(W1−W2)/2·t2. Unless this condition is satisfied, the track protruding portion toward the adjacent track side does not exist so that there arises no problem to be solved by the present invention.

Further, since the trailing end 40*a* should not interfere with the adjacent data track while it basically extends over the data track width even when the skew angle θ occurs, it is necessary that W1 maintain a relationship of 2Tp−Tw−2ΔW≧W1≧(Tw+2ΔW)/cos θmax as a precondition.

In this inequality, it is desirable that W1 be set to 0.9 times and preferably 0.8 times an upper limit value (2Tp−Tw−2ΔW) in consideration of servo position error displacement.

θmax represents the maximum skew angle. Further, as described above, there is the relationship of ΔW=δ/tan η.

As described above, in the present invention, the section of the convex-portion perpendicular magnetic recording layer (data track) 10 in the track width direction (track radial direction) has the trapezoidal shape with its lower side longer than its upper side. It is desirable that the inclination angle η of the trapezoidal shape be set in the range of 50 to 85 degrees, preferably 65 to 85 degrees, and more preferably 70 to 80 degrees. When the inclination angle η becomes less than 50 degrees, there tends to occur a disadvantage that a recording surface with respect to a recording magnetic field from the main magnetic pole increases and an influence of recording from the adjacent track increases so that the noise increases. On the other hand, when the inclination angle η exceeds 85 degrees, there tends to occur a disadvantage that it becomes difficult to exhibit an operation of absorbing servo position error displacement on an oblique surface of the data track for buffering.

Description of Optimal Setting in Third Mode

Figure 12A:
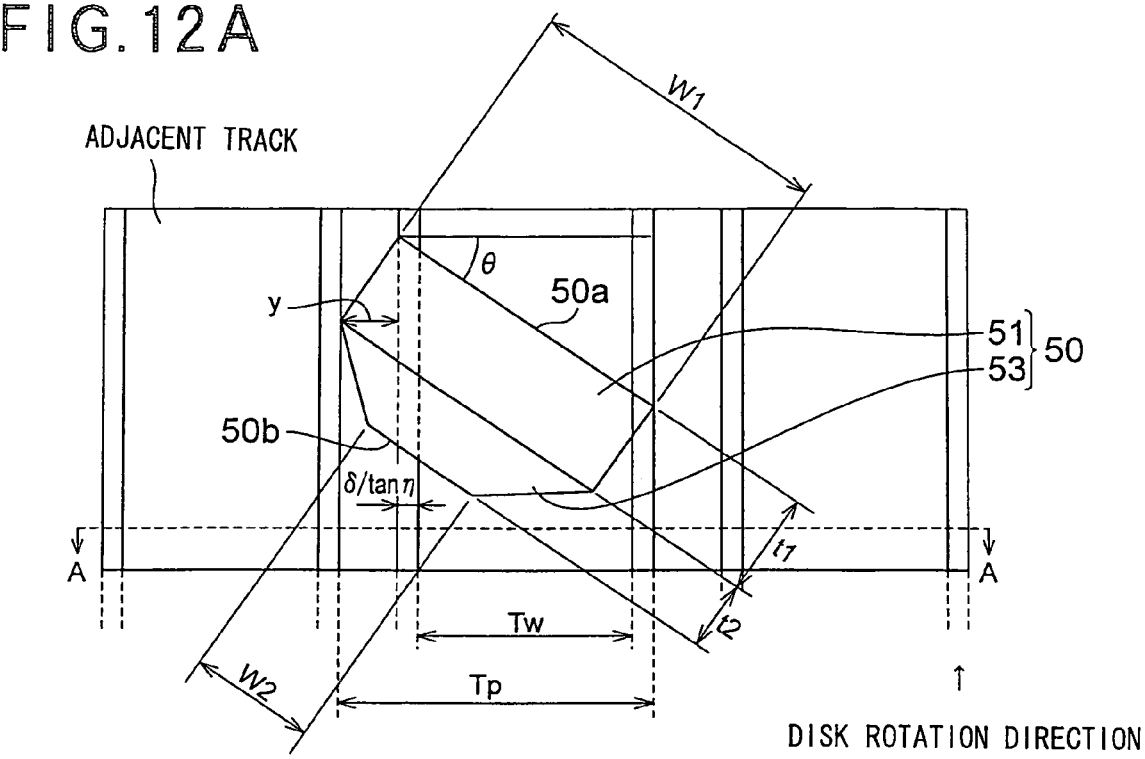
FIG. 12(A) is a diagram showing a positional relationship between an outline shape of a magnetic pole and convex-portion perpendicular recording layers (data tracks) in a planar fashion and FIG. 12(B) is a sectional view taken along line A—A in FIG. 12(A), wherein sections of the perpendicular magnetic recording layers (data tracks) are substantially shown.
Figure 12B:
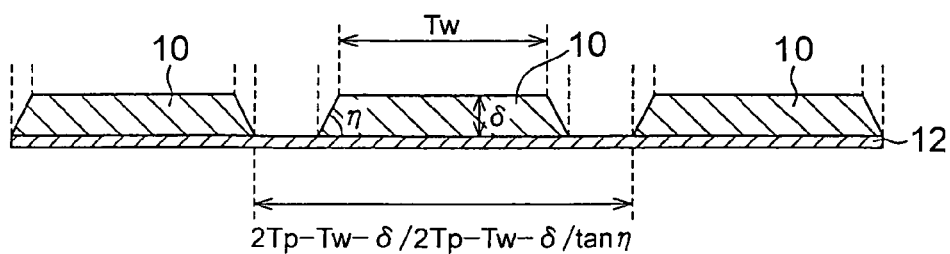

FIG. 12(A) is a diagram showing an outline shape of another preferred main magnetic pole 50 at an air bearing surface of a magnetic head and further showing a positional relationship between the outline shape of the main magnetic pole 50 and convex-portion perpendicular recording layers (data tracks) 10 in a planar fashion. FIG. 12(B) is a sectional view taken along line A—A in FIG. 12(A), wherein sections of the perpendicular magnetic recording layers (data tracks) 10 are substantially shown. The outline shape of the main magnetic pole 50 in FIG. 12(A) is that obtained when the magnetic head is seen from the magnetic recording medium side. The rotation direction of a disk-shaped magnetic recording medium (so-called disk rotation direction) is identified by an arrow 55 directed upward from the lower side in FIG. 12(A).

The outline shape of the main magnetic pole 50 shown in FIG. 12(A) comprises a first quadrangular portion 51 extending with a constant width from a trailing end 50*a* having a width W1 and located on the downstream side of the rotation direction of the magnetic recording medium toward the upstream side, and a second quadrangular portion 53 that is continuous with the first quadrangular portion 51 and is continuously reduced in width toward a leading end 50*b* having a width W2 and located on the further upstream side.

As shown in FIG. 12(A), the first quadrangular portion 51 has a rectangular shape having the width W1 and a thickness (length in the track circumferential direction) t1. On the other hand, the second quadrangular portion 53 has an (inverted) trapezoidal shape having a thickness t2 and continuously reduced in width as approaching from a connection portion (width W1) continuous with the first quadrangular portion 51 toward the leading end 50*b* with the width W2 located on the upstream side.

As shown in FIG. 12(A), the convex-portion perpendicular magnetic recording layers (data tracks) 10 and the main magnetic pole 50 are in a relationship of disposition such that the main magnetic pole 50 causes skew angles θ with respect to circumferential directions of at least some of the data tracks of the magnetic recording medium. Herein, the data track pitch of the magnetic recording medium is given as Tp and the width of an upper surface of the convex-portion perpendicular magnetic recording-layer (data track) 10 is given as Tw.

Further, as shown in FIG. 12(B), the convex-portion perpendicular magnetic recording layer (data track) 10 in the present invention is configured such that a section thereof in the track width direction (track radial direction) has a trapezoidal shape with a larger width at its lower part, wherein the inclination angle of the trapezoidal shape is given as $\eta$ and the thickness of the convex-portion perpendicular magnetic recording layer is given as $\delta$.

In the third mode shown in FIG. 12(A), a relationship among the skew angle $\theta$, W1, W2, and t2 satisfies a condition of $\theta < \tan^{-1}(W1-W2)/2 \cdot t2$.

In this case, only the rectangular portion, i.e. only the first quadrangular portion 51 (width W1 and thickness (length in the track circumferential direction) t1), exerts an influence upon unwanted writing into the adjacent track. It is possible to substantially ignore the second quadrangular portion 53.

In the perpendicular magnetic recording model of the present invention based on the parameter setting as described above, it is necessary to satisfy an inequality (3) below in order to prevent unwanted writing into the adjacent track to thereby realize the high-density recording having extremely high reliability.

$$Tp-Tw \geq t1 \cdot \sin \theta + 2\delta/\tan \eta \quad (3)$$

The basic idea in deriving the inequality (3) is as follows.

(i) When the skew angle $\theta$ occurs, the corner, near the leading side, of the rectangular portion, i.e. the first quadrangular portion 51 (width W1 and thickness (length in the track circumferential direction) t1), enters an area of the nonmagnetic layer 20 so that the main magnetic pole 50 partly protrudes from the data track as shown in FIG. 12(A). In this event, given that the protruding distance into the area of the nonmagnetic layer 20 is y, $y=t1 \cdot \sin \theta$. Therefore, the condition where this protruding distance $t1 \cdot \sin \theta$ does not interfere with the adjacent data track is defined as $Tp-Tw-2\Delta W \geq t1 \cdot \sin \theta$. Since $\Delta W=\delta/\tan \eta$, the foregoing inequality (3) is obtained by eliminating $\Delta W$.

Further, since the trailing end 50a should not interfere with the adjacent data track while it basically extends over the data track width even when the skew angle $\theta$ occurs, it is necessary that W1 maintain a relationship of $2Tp-Tw-2\Delta W \geq W1 \geq (Tw+2\Delta W)/\cos \theta max$ as a precondition.

In this inequality, it is desirable that W1 be set to 0.9 times and preferably 0.8 times an upper limit value ($2Tp-Tw-2\Delta W$) in consideration of servo position error displacement.

$\theta max$ represents the maximum skew angle. Further, as described above, there is the relationship of $\Delta W=\delta/\tan \eta$.

As described above, in the present invention, the section of the convex-portion perpendicular magnetic recording layer (data track) 10 in the track width direction (track radial direction) has the trapezoidal shape with its lower side longer than its upper side. It is desirable that the inclination angle $\eta$ of the trapezoidal shape be set in the range of 50 to 85 degrees, preferably 65 to 85 degrees, and more preferably 70 to 80 degrees. When the inclination angle $\eta$ becomes less than 50 degrees, there tends to occur a disadvantage that a recording surface with respect to a recording magnetic field from the main magnetic pole increases and an influence of recording from the adjacent track increases so that the noise increases. On the other hand, when the inclination angle $\eta$ exceeds 85 degrees, there tends to occur a disadvantage that it becomes difficult to exhibit an operation of absorbing servo position error displacement on an oblique surface of the data track for buffering.

Hereinbelow, specific examples will be shown to describe the present invention in more detail.

(Structure of Magnetic Recording Medium)

A sample of a magnetic recording medium having data tracks (and servo tracks) with a section structure as shown in FIG. 3 was prepared in the following manner.

Use was made of a mirror-polished 1-inch glass disk substrate 15 having an inner diameter of 7.0 mm and an outer diameter of 27.4 mm. Then, a PtMn layer as an orientation layer 14 (underlayer 14) was formed to a thickness of 15 nm on the substrate 15 and a soft magnetic layer 11 made of CoZrNb was formed to a thickness of 150 nm on the layer 14.

The orientation layer 14 was formed for giving an anisotropy to the soft magnetic layer 11 in the track direction. Then, an intermediate layer 12 made of a nonmagnetic alloy Ru was further formed to a thickness of 8 nm on the soft magnetic layer 11. Subsequently, a perpendicular magnetic recording layer was formed to a thickness of 15 nm on the intermediate layer 12, then etching with a predetermined pattern was carried out for forming a predetermined convex-concave shape to thereby obtain convex perpendicular magnetic recording layers 10. Then, $SiO_2$ was sputtered to fill etched concave portions.

Thereafter, oblique ion-beam etching was carried out while rotating the medium filled with $SiO_2$, thereby removing excessive $SiO_2$ formed on the perpendicular magnetic recording layers 10 to flatten the surface of the medium. A protective layer 13 in the form of a carbon thin film was formed to a thickness of 4 nm on the flattened surface of the medium by the CVD method, and a Fomblin lubricant was further applied to a thickness of 1 nm onto the protective layer 13, thereby completing the medium sample.

For the perpendicular magnetic recording layer, use was made of a material in which CoPt ferromagnetic grains were contained in a matrix in $SiO_2$.

The saturation magnetization Ms and the remanent saturation magnetization Mr of the perpendicular magnetic recording layers 10 were Ms=350 emu/cc (350 kA/m) and Mr=340 emu/cc (340 kA/m).

The perpendicular magnetic recording medium subjected to the convex-concave processing for the servo areas and data areas was, for magnetizing the convex-portion perpendicular magnetic recording layers that produce servo signal magnetic fields, placed between magnetic poles of an electromagnet where a DC magnetic field of 15 kOe (1193 kA/m) was generated so that the disk surfaces were set parallel to the magnetic pole surfaces, and then the perpendicular magnetic recording layers, each having a trapezoidal cross-section, in the servo areas and data areas were magnetized at a time to thereby record servo signals.

The recording density of the servo signals was set to 130 K·FRPI (Flux Reversal Per Inch). Therefore, the track pitch Tp of the data area was set to 190 nm corresponding to 133.7 K·TPI (Track Per Inch).

The measurement was carried out by classifying test specifications into the following three types and description thereof will be given individually.

(Test Specification 1)

Use was made of a writing magnetic head having an outline shape (tip shape: trapezoidal shape) of a main magnetic pole 30 as shown in FIG. 8. A relationship between the main magnetic pole 30 and the data tracks is shown in FIG. 9(A).

By changing values of parameters with respect to the main magnetic pole, the perpendicular magnetic recording medium, and the skew angle θ as shown in Table 1 below, recording of 200 K·FRPI (Flux Reversal Per Inch) was carried out. Under the condition that the skew angle was given, an influence onto the adjacent data track was reproduced by the use of a reproducing head (GMR reproducing element), thereby verifying a case satisfying or not satisfying the condition of the following inequality (1). As a result of the detection by the reproducing head, when there was an influence of recording onto the adjacent data track, "YES" is indicated in Table 1, while, when there was almost no influence, "NO" is indicated in Table 1.

$$Tp-Tw \geq (t^2+(W1-W2)^2/4)^{1/2} \cdot \sin\{\theta-\tan^{-1}(W1-W2)/2t\}+2\delta/\tan\eta \quad (1)$$

In Table 1, the right side of the inequality (1) is given as Y1* like the following.

$$Y1^*=(t^2+(W1-W2)^2/4)^{1/2} \cdot \sin\{\theta-\tan^{-1}(W1-W2)/2t\}+2\delta/\tan\eta$$

In this test method, for the purpose of detecting unwanted writing into the adjacent data track, a recording frequency used by the main magnetic pole was set different from a recording frequency recorded in the adjacent data track in advance, and the influence of writing onto the adjacent data track was inspected by separating a signal and measuring an output value thereof by the use of a spectrum analyzer.

Test results of Test Specification 1 are shown in Table 1 below.

[Table 1]

TABLE 1

| No. | Tp-Tw (nm) | Y1* (nm) | Tp (nm) | Tw (nm) | W1 (nm) | W2 (nm) | t (nm) | θ (Degree) | δ (nm) | η (Degree) | Presence of Influence to Adjacent Track |
|---|---|---|---|---|---|---|---|---|---|---|---|
| I-1 | 80.0 | 98.4 | 190 | 110 | 150 | 70 | 250 | 30 | 15 | 75 | YES (x) |
| I-2 | 80.0 | 80.0 | 190 | 110 | 150 | 70 | 250 | 25.6 | 15 | 75 | NO (o) |
| I-3 | 80.0 | 34.1 | 190 | 110 | 150 | 70 | 250 | 15 | 15 | 75 | NO (o) |
| I-4 | 92.5 | 114.7 | 190 | 97.5 | 150 | 50 | 300 | 30 | 15 | 75 | YES (x) |
| I-5 | 92.5 | 92.5 | 190 | 97.5 | 150 | 50 | 300 | 25.6 | 15 | 75 | NO (o) |
| I-6 | 92.5 | 37.4 | 190 | 97.5 | 150 | 50 | 300 | 15 | 15 | 75 | NO (o) |

Under the condition of No. I-1 shown in Table 1, as a result of performing the recording and reproduction, there was an influence of unwanted writing onto the adjacent data track by the main magnetic pole 30, i.e. there was observed a reproduced signal of a signal written in the adjacent data track in advance. This is because since Tp−Tw<Y1*, the condition of the inequality (1) is not satisfied.

Under each of the conditions of Nos. I-2 and I-3, there was no influence of recording onto the adjacent data track. This is because since Tp−Tw≧Y1*, the condition of the inequality (1) is satisfied. Note that, under the condition of No. I-2, Tp−Tw=Y1* where the skew angle θ takes a maximum value θmax.

Further, the condition, as a precondition, that defines the magnitude of W1 becomes 209.5 (=0.8×261.9)nm>W1>130.9 nm.

Therefore, W1=150 nm is satisfied. In this inequality, 0.8 is used as a coefficient. However, the coefficient may be 0.9 or 0.7, which also satisfies the condition.

Under each of the conditions of Nos. I-4 to I-6, the influence onto the adjacent data track was examined with t=300 nm, i.e. by increasing the thickness t of the main magnetic pole by 50 nm as compared with the conditions of Nos. I-1 to I-3. Under the condition of No. I-4, as a result of performing the recording and reproduction, there was an influence of recording onto the adjacent data track by the main magnetic pole, i.e. there was observed a reproduced signal caused by the recording. This is because since Tp−Tw<Y1*, the condition of the inequality (1) is not satisfied.

Under each of the conditions of Nos. I-5 and I-6, there was no influence of recording onto the adjacent data track. This is because since Tp−Tw≧Y1*, the condition of the inequality (1) is satisfied. Note that, under the condition of No. I-5, Tp−Tw=Y1* where the skew angle θ takes a maximum value θmax.

Further, under each of the conditions of Nos. I-4 to I-6, the condition, as a precondition, that defines the magnitude of W1 becomes 219.5 (=0.8×274.4)nm>W1>117.0 nm.

Therefore, W1=150 nm is satisfied. In this inequality, 0.8 is used as a coefficient. However, the coefficient may be 0.9 or 0.7, which also satisfies the condition.

When the thickness t of the main magnetic pole 30 is increased, a margin of Tp−Tw should be increased and, when Tp, W1, and θmax are fixed, Tw is reduced so that the margin of Tp−Tw should be set wide.

With respect to the discrete tracks having the convex-concave structure as in the present invention, since there are no perpendicular magnetic recording layers in the concave-portion areas, the value of W1 of the main magnetic pole can be set greater as compared with the normal continuous medium having no convex-concave structure.

(Test Specification 2)

Use was made of a writing magnetic head having an outline shape of a main magnetic pole 40 as shown in FIG. 10. A first quadrangular portion 41 had, as shown in FIG. 10, a rectangular shape having a width W1 and a thickness (length in the track circumferential direction) t1. On the other hand, a second quadrangular portion 43 had, as shown in FIG. 10, an (inverted) trapezoidal shape having a thickness t2 and continuously reduced in width as approaching from a connection portion (width W1) continuous with the first quadrangular portion 41 toward a leading end 40b with a width W2 located on the upstream side.

A relationship between the main magnetic pole 40 and the data tracks is shown in FIG. 11(A).

By changing values of parameters with respect to the main magnetic pole, the perpendicular magnetic recording medium, and the skew angle θ as shown in Table 2 below, recording of 200 K·FRPI (Flux Reversal Per Inch) was carried out. Under the condition that the skew angle was given, an influence onto the adjacent data track was reproduced by the use of a reproducing head (GMR reproducing element), thereby verifying a case satisfying or not satisfying the condition of the following inequality (2). As a result of the detection by the reproducing head, when there was an influence of recording onto the adjacent data track, "YES" is indicated in Table 2, while, when there was almost no influence, "NO" is indicated in Table 2.

$$Tp-Tw \geq (t2^2+(W1-W2)^2/4)^{1/2} \cdot \sin\{\theta-\tan^{-1}(W1-W2)/2t2\}+t1 \cdot \sin\theta+2\delta/\tan\eta \quad (2)$$

In Table 2, the right side of the inequality (2) is given as Y2* like the following.

$$Y2^* = (t2^2+(W1-W2)^2/4)^{1/2} \cdot \sin\{\theta-\tan^{-1}(W1-W2)/2t2\}+t1 \cdot \sin\theta+2\delta/\tan\eta$$

In this test method, for the purpose of detecting unwanted writing into the adjacent data track, a recording frequency used by the main magnetic pole was set different from a recording frequency recorded in the adjacent data track in advance, and the influence of writing onto the adjacent data track was inspected by separating a signal and measuring an output value thereof by the use of a spectrum analyzer.

Test results of Test Specification 2 are shown in Table 2 below.

[Table 2]

TABLE 2

| No. | Tp-Tw (nm) | Y2* (nm) | Tp (nm) | Tw (nm) | W1 (nm) | W2 (nm) | t1 (nm) | t2 (nm) | θ (Degree) | δ (nm) | η (Degree) | Presence of Influence to Adjacent Track |
|---|---|---|---|---|---|---|---|---|---|---|---|---|
| II-1 | 70.0 | 98.4 | 190 | 120 | 150 | 70 | 50 | 200 | 30 | 15 | 75 | YES (x) |
| II-2 | 70.0 | 70.0 | 190 | 120 | 150 | 70 | 50 | 200 | 25.6 | 15 | 75 | NO (o) |
| II-3 | 70.0 | 34.1 | 190 | 120 | 150 | 70 | 50 | 200 | 15 | 15 | 75 | NO (o) |
| II-4 | 90.0 | 123.3 | 190 | 100 | 150 | 70 | 150 | 150 | 30 | 15 | 75 | YES (x) |
| II-5 | 90.0 | 90.0 | 190 | 100 | 150 | 70 | 150 | 150 | 25.6 | 15 | 75 | NO (o) |
| II-6 | 90.0 | 47.0 | 190 | 100 | 150 | 70 | 150 | 150 | 15 | 15 | 75 | NO (o) |

Under the condition of No. II-1 shown in Table 2, as a result of performing the recording and reproduction, there was an influence of unwanted writing onto the adjacent data track by the main magnetic pole 40, i.e. there was observed a reproduced signal of a signal written in the adjacent data track in advance. This is because since Tp–Tw<Y2*, the condition of the inequality (2) is not satisfied.

Under each of the conditions of Nos. II-2 and II-3, there was no influence of recording onto the adjacent data track. This is because since Tp–Tw≧Y2*, the condition of the inequality (2) is satisfied. Note that, under the condition of No. II-2, Tp–Tw=Y2* where the skew angle θ takes a maximum value θmax.

Further, the condition, as a precondition, that defines the magnitude of W1 becomes 201.5 (=0.8×251.9)nm>W1>139.3 nm.

Therefore, W1=150 nm is satisfied. In this inequality, 0.8 is used as a coefficient. However, the coefficient may be 0.9 or 0.7, which also satisfies the condition.

Under each of the conditions of Nos. II-4 to II-6, the influence onto the adjacent data track was examined with t1=150 nm and t2=150 nm (the whole thickness of the main magnetic pole was increased by 50 nm as compared with the conditions of Nos. II-1 to II-3). Under the condition of No. II-4, as a result of performing the recording and reproduction, there was an influence of recording onto the adjacent data track by the main magnetic pole, i.e. there was observed a reproduced signal caused by the recording. This is because since Tp–Tw<Y2*, the condition of the inequality (2) is not satisfied.

Under each of the conditions of Nos. II-5 and II-6, there was no influence of recording onto the adjacent data track. This is because since Tp–Tw≧Y2*, the condition of the inequality (2) is satisfied. Note that, under the condition of No. II-5, Tp–Tw=Y2* where the skew angle θ takes a maximum value θmax.

Further, under each of the conditions of Nos. II-4 to II-6, the condition, as a precondition, that defines the magnitude of W1 becomes 224 (=0.8×280)nm>W1>117.6 nm.

Therefore, W1=150 nm is satisfied. In this inequality, 0.8 is used as a coefficient. However, the coefficient may be 0.9 or 0.7, which also satisfies the condition.

When the whole thickness t1+t2 of the main magnetic pole 40 is increased, a margin of Tp–Tw should be increased and, when Tp, W1, and θmax are fixed, Tw is reduced so that the margin of Tp–Tw should be set wide.

With respect to the discrete tracks having the convex-concave structure as in the present invention, since there are no perpendicular magnetic recording layers in the concave-portion areas, the value of W1 of the main magnetic pole can be set greater as compared with the normal continuous medium having no convex-concave structure.

(Test Specification 3)

Use was made of a writing magnetic head having an outline shape of a main magnetic pole 50 as shown in FIG. 12(A). A first quadrangular portion 51 had, as shown in FIG. 12(A), a rectangular shape having a width W1 and a thickness (length in the track circumferential direction) t1. On the other hand, a second quadrangular portion 53 had, as shown in FIG. 12(A), an (inverted) trapezoidal shape having a thickness t2 and continuously reduced in width as approaching from a connection portion (width W1) continuous with the first quadrangular portion 51 toward a leading end 50b with a width W2 located on the upstream side.

In Test Specification 3, as compared with Test Specification 2, the relationship among the skew angle θ, W1, W2, and t2 satisfies a condition of θ<tan$^{-1}$(W1−W2)/2·t2. In this case, only the rectangular portion, i.e. only the first quadrangular portion 51 (width W1 and thickness (length in the track circumferential direction) t1), exerts an influence upon unwanted writing into the adjacent track. It is possible to substantially ignore the second quadrangular portion 53.

By changing values of parameters with respect to the main magnetic pole, the perpendicular magnetic recording medium, and the skew angle θ as shown in Table 3 below, recording of 200 K·FRPI (Flux Reversal Per Inch) was carried out. Under the condition that the skew angle was given, an influence onto the adjacent data track was reproduced by the use of a reproducing head (GMR reproducing element), thereby verifying a case satisfying or not satisfying the condition of the following inequality (3). As a result of the detection by the reproducing head, when there was an influence of recording onto the adjacent data track, "YES" is indicated in Table 3, while, when there was almost no influence, "NO" is indicated in Table 3.

$$Tp - Tw \geq t1 \cdot \sin \theta + 2\delta/\tan \eta \qquad (3)$$

In Table 3, the right side of the inequality (3) is given as Y3* like the following.

$$Y3^* = t1 \cdot \sin \theta + 2\delta/\tan \eta$$

In this test method, for the purpose of detecting unwanted writing into the adjacent data track, a recording frequency used by the main magnetic pole was set different from a recording frequency recorded in the adjacent data track in advance, and the influence of writing onto the adjacent data track was inspected by separating a signal and measuring an output value thereof by the use of a spectrum analyzer.

Test results of Test Specification 3 are shown in Table 3 below.

[Table 3]

TABLE 3

| No. | Tp-Tw (nm) | Y3* (nm) | Tp (nm) | Tw (nm) | W1 (nm) | W2 (nm) | t1 (nm) | t2 (nm) | θ (Degree) | δ (nm) | η (Degree) | Presence of Influence to Adjacent Track |
|---|---|---|---|---|---|---|---|---|---|---|---|---|
| III-1 | 90.0 | 108.0 | 190 | 100 | 150 | 70 | 50 | 200 | 30 | 15 | 75 | YES (x) |
| III-2 | 90.0 | 90.0 | 190 | 100 | 150 | 70 | 50 | 200 | 24.2 | 15 | 75 | NO (o) |
| III-3 | 90.0 | 59.8 | 190 | 100 | 150 | 70 | 50 | 200 | 15 | 15 | 75 | NO (o) |

Under the condition of No. III-1 shown in Table 3, as a result of performing the recording and reproduction, there was an influence of unwanted writing onto the adjacent data track by the main magnetic pole 50, i.e. there was observed a reproduced signal of a signal written in the adjacent data track in advance. This is because since Tp−Tw<Y3*, the condition of the inequality (3) is not satisfied.

Under each of the conditions of Nos. III-2 and III-3, there was no influence of recording onto the adjacent data track. This is because since Tp−Tw≧Y3*, the condition of the inequality (3) is satisfied. Note that, under the condition of No. III-2, Tp−Tw=Y3* where the skew angle θ takes a maximum value θmax.

Further, the condition, as a precondition, that defines the magnitude of W1 becomes $$217.5 \ (=0.8 \times 271.9) \text{nm} > W1 > 118.5 \text{ nm}.$$

Therefore, W1=150 nm is satisfied. In this inequality, 0.8 is used as a coefficient. However, the coefficient may be 0.9 or 0.7, which also satisfies the condition.

The effects of the present invention are clear from the foregoing test results. Specifically, the present invention is a magnetic recording and reproducing apparatus comprising a magnetic head having a main magnetic pole, a magnetic recording medium of a discrete type having a predetermined convex-concave structure at data tracks and servo tracks, and a drive device body that can operate to rotationally drive the magnetic recording medium in a constant direction and cause the magnetic head to be movable in substantially radial directions of the magnetic recording medium, wherein a relationship among parameters specifying a predetermined convex-concave shape of the data track, parameters specifying the main magnetic pole, and a skew angle is defined by a predetermined inequality. By setting-a specification of the magnetic recording and reproducing apparatus in the range defined by the inequality, it is possible to prevent unwanted writing into the adjacent track to thereby realize the high-density recording having extremely high reliability.

The magnetic recording and reproducing apparatus of the present invention is particularly used as a component of a computer and can be utilized in the apparatus industry for information recording.

What is claimed is:

1. A magnetic recording and reproducing apparatus comprising:
    a magnetic head having at least a main magnetic pole;
    a magnetic recording medium; and
    a drive device body that can operate to rotationally drive said magnetic recording medium in a constant direction and cause said magnetic head to be movable in substantially radial directions of said magnetic recording medium,
    wherein said magnetic recording medium has data tracks for recording data information and servo tracks for recording tracking servo information, said magnetic recording medium being a discrete medium in which groups of said tracks are formed as a plurality of recording elements divided in a predetermined convex-concave pattern,
    said data tracks and said servo tracks of said magnetic recording medium are formed by convex-portion perpendicular magnetic recording layers and a section of each of said convex-portion perpendicular magnetic recording layers in a track width direction (track radial direction) has a trapezoidal shape,
    an outline shape of said main magnetic pole at an air bearing surface of said magnetic head is a shape that is continuously reduced in width from its trailing end located on a downstream side of a rotation direction of said magnetic recording medium toward its leading end located on an upstream side thereof,
    said magnetic recording medium and said magnetic head are in a relationship of disposition such that said main magnetic pole causes skew angles θ with respect to circumferential directions of at least some of said data tracks of said magnetic recording medium, and
    given that a data track pitch of said magnetic recording medium is Tp, a width of an upper surface of each of said convex-portion perpendicular magnetic recording layers of said data tracks is Tw, a width of the trailing end of said main magnetic pole in said magnetic head is W1, a width of the leading end of said main magnetic pole in said magnetic head is W2, a thickness (length in a track circumferential direction) of said main magnetic pole in said magnetic head is t, an inclination angle of the trapezoidal shape of the section of each of said convex-portion perpendicular magnetic recording layers in the track width direction (track radial direction) is η, and a thickness of each of said convex-portion perpendicular magnetic recording layers is δ, a relationship of an inequality (1) is satisfied when, as a precondition, a relationship among θ, W1, W2, and t satisfies a condition of θ>$\tan^{-1}$ (W1−W2)/2·t, said inequality (1) given as $$Tp-Tw \geq (t^2+(W1-W2)^2/4)^{1/2} \cdot \sin\{\theta-\tan^{-1}(W1-W2)/2t\}+2\delta/\tan\eta.$$

2. The magnetic recording and reproducing apparatus according to claim 1, wherein a soft magnetic layer for assisting a magnetic field in a perpendicular direction is provided under the data tracks and the servo tracks formed by said convex-portion perpendicular magnetic recording layers.

3. The magnetic recording and reproducing apparatus according to claim 2, wherein a recording magnetic field generated by the main magnetic pole of said magnetic head passes through the corresponding convex-portion perpendicular magnetic recording layer and serves to perform perpendicular magnetic recording in said corresponding convex-portion perpendicular magnetic recording layer, and then returns to an auxiliary magnetic pole through said soft magnetic layer.

4. The magnetic recording and reproducing apparatus according to claim 1, wherein the outline shape of said main magnetic pole at the air bearing surface of said magnetic head is a trapezoidal shape that is continuously reduced in width from its trailing end located on the downstream side of the rotation direction of said magnetic recording medium toward its leading end located on the upstream side thereof.

5. The magnetic recording and reproducing apparatus according to claim 1, wherein when a maximum skew angle is given as θmax, a condition of an inequality (1-2) is satisfied as a precondition, said inequality (1-2) given as $$2Tp-Tw-2\Delta W \geq W1 \geq (Tw+2\Delta W)/\cos\theta_{max}$$

where ΔW=δ/tan η.

6. The magnetic recording and reproducing apparatus according to claim 1, wherein the inclination angle η of the trapezoidal shape of the section of each of said convex-portion perpendicular magnetic recording layers in the track width direction (track radial direction) falls within the angular range of 50 to 85 degrees.

7. The magnetic recording and reproducing apparatus according to claim 1, wherein said magnetic recording medium is the discrete medium in which said data tracks for recording the data information and said servo tracks for recording the tracking servo information are formed as the plurality of recording elements divided in the predetermined convex-concave pattern and concave portions are filled with a nonmagnetic material for causing a discrete operation to be exhibited.

8. A magnetic recording and reproducing apparatus comprising:

a magnetic head having at least a main magnetic pole;
a magnetic recording medium; and
a drive device body that can operate to rotationally drive said magnetic recording medium in a constant direction and cause said magnetic head to be movable in substantially radial directions of said magnetic recording medium,
wherein said magnetic recording medium has data tracks for recording data information and servo tracks for recording tracking servo information, said magnetic recording medium being a discrete medium in which groups of said tracks are formed as a plurality of recording elements divided in a predetermined convex-concave pattern,
said data tracks and said servo tracks of said magnetic recording medium are formed by convex-portion perpendicular magnetic recording layers and a section of each of said convex-portion perpendicular magnetic recording layers in a track width direction (track radial direction) has a trapezoidal shape,
an outline shape of said main magnetic pole at an air bearing surface of said magnetic head comprises a first quadrangular portion extending with a constant width from its trailing end located on a downstream side of a rotation direction of said magnetic recording medium toward an upstream side thereof, and a second quadrangular portion that is continuous with said first quadrangular portion and is continuously reduced in width toward its leading end located on a further upstream side,
said magnetic recording medium and said magnetic head are in a relationship of disposition such that said main magnetic pole causes skew angles θ with respect to circumferential directions of at least some of said data tracks of said magnetic recording medium, and
given that a data track pitch of said magnetic recording medium is Tp, a width of an upper surface of each of said convex-portion perpendicular magnetic recording layers of said data tracks is Tw, a width of the trailing end of said first quadrangular portion of said main magnetic pole in said magnetic head is W1, a thickness (length in a track circumferential direction) of said first quadrangular portion is t1, a width of the leading end of said second quadrangular portion of said main magnetic pole in said magnetic head is W2, a thickness (length in the track circumferential direction) of said second quadrangular portion is t2, an inclination angle of the trapezoidal shape of the section of each of said convex-portion perpendicular magnetic recording layers in the track width direction (track radial direction) is η, and a thickness of each of said convex-portion perpendicular magnetic recording layers is δ, a relationship of an inequality (2) is satisfied when, as a precondition, a relationship among θ, W1, W2, and t2 satisfies a condition of θ>$\tan^{-1}$ (W1−W2)/2·t2, said inequality (2) given as $$Tp-Tw \geq (t2^2+(W1-W2)^2/4)^{1/2} \cdot \sin\{\theta-\tan^{-1}(W1 W2)/2t2\}+t1\cdot\sin\theta+2\delta/\tan\eta.$$

9. The magnetic recording and reproducing apparatus according to claim 8, wherein a soft magnetic layer for assisting a magnetic field in a perpendicular direction is provided under the data tracks and the servo tracks formed by said convex-portion perpendicular magnetic recording layers.

10. The magnetic recording and reproducing apparatus according to claim 9, wherein a recording magnetic field generated by the main magnetic pole of said magnetic head passes through the corresponding convex-portion perpendicular magnetic recording layer and serves to perform perpendicular magnetic recording in said corresponding convex-portion perpendicular magnetic recording layer, and then returns to an auxiliary magnetic pole through said soft magnetic layer.

11. The magnetic recording and reproducing apparatus according to claim 8, wherein said second quadrangular portion in the outline shape of said main magnetic pole at the air bearing surface of said magnetic head has a trapezoidal shape that is continuously reduced in width from the downstream side of the rotation direction of said magnetic recording medium toward its leading end located on the upstream side thereof.

12. The magnetic recording and reproducing apparatus according to claim 8, wherein when a maximum skew angle is given as θmax, a condition of an inequality (1-2) is satisfied as a precondition, said inequality (1-2) given as $$2Tp-Tw-2\Delta W \geq W1 \geq (Tw+2\Delta W)/\cos \theta max$$

where $\Delta W = \delta/\tan \eta$

13. The magnetic recording and reproducing apparatus according to claim 8, wherein the inclination angle η of the trapezoidal shape of the section of each of said convex-portion perpendicular magnetic recording layers in the track width direction (track radial direction) falls within the angular range of 50 to 85 degrees.

14. The magnetic recording and reproducing apparatus according to claim 8, wherein said magnetic recording medium is the discrete medium in which said data tracks for recording the data information and said servo tracks for recording the tracking servo information are formed as the plurality of recording elements divided in the predetermined convex-concave pattern and concave portions are filled with a nonmagnetic material for causing a discrete operation to be exhibited.

15. A magnetic recording and reproducing apparatus comprising:
a magnetic head having at least a main magnetic pole;
a magnetic recording medium; and
a drive device body that can operate to rotationally drive said magnetic recording medium in a constant direction and cause said magnetic head to be movable in substantially radial directions of said magnetic recording medium,
wherein said magnetic recording medium has data tracks for recording data information and servo tracks for recording tracking servo information, said magnetic recording medium being a discrete medium in which groups of said tracks are formed as a plurality of recording elements divided in a predetermined convex-concave pattern,
said data tracks and said servo tracks of said magnetic recording medium are formed by convex-portion perpendicular magnetic recording layers and a section of each of said convex-portion perpendicular magnetic recording layers in a track width direction (track radial direction) has a trapezoidal shape,
an outline shape of said main magnetic pole at an air bearing surface of said magnetic head comprises a first quadrangular portion extending with a constant width from its trailing end located on a downstream side of a rotation direction of said magnetic recording medium toward an upstream side thereof, and a second quadrangular portion that is continuous with said first quadrangular portion and is continuously reduced in width toward its leading end located on a further upstream side,
said magnetic recording medium and said magnetic head are in a relationship of disposition such that said main magnetic pole causes skew angles θ with respect to circumferential directions of at least some of said data tracks of said magnetic recording medium, and
given that a data track pitch of said magnetic recording medium is Tp, a width of an upper surface of each of said convex-portion perpendicular magnetic recording layers of said data tracks is Tw, a width of the trailing end of said first quadrangular portion of said main magnetic pole in said magnetic head is W1, a thickness (length in a track circumferential direction) of said first quadrangular portion is t1, a width of the leading end of said second quadrangular portion of said main magnetic pole in said magnetic head is W2, a thickness (length in the track circumferential direction) of said second quadrangular portion is t2, an inclination angle of the trapezoidal shape of the section of each of said convex-portion perpendicular magnetic recording layers in the track width direction (track radial direction) is η, and a thickness of each of said convex-portion perpendicular magnetic recording layers is δ,
a relationship of an inequality (2) is satisfied when, as a precondition, a relationship among θ, W1, W2, and t2 satisfies a condition of $\theta < \tan^{-1} (W1-W2)/2 \cdot t2$, said inequality (3) given as $$Tp - Tw \geq t1 \cdot \sin \theta + 2\delta/\tan \eta.$$

16. The magnetic recording and reproducing apparatus according to claim 15, wherein a soft magnetic layer for assisting a magnetic field in a perpendicular direction is provided under the data tracks and the servo tracks formed by said convex-portion perpendicular magnetic recording layers.

17. The magnetic recording and reproducing apparatus according to claim 16, wherein a recording magnetic field generated by the main magnetic pole of said magnetic head passes through the corresponding convex-portion perpendicular magnetic recording layer and serves to perform perpendicular magnetic recording in said corresponding convex-portion perpendicular magnetic recording layer, and then returns to an auxiliary magnetic pole through said soft magnetic layer.

18. The magnetic recording and reproducing apparatus according to claim 15, wherein said second quadrangular portion in the outline shape of said main magnetic pole at the air bearing surface of said magnetic head has a trapezoidal shape that is continuously reduced in width from the downstream side of the rotation direction of said magnetic recording medium toward its leading end located on the upstream side thereof.

19. The magnetic recording and reproducing apparatus according to claim 15, wherein when a maximum skew angle is given as θmax, a condition of an inequality (1-2) is satisfied as a precondition, said inequality (1-2) given as $$2Tp-Tw-2\Delta W \geq W1 \geq (Tw+2\Delta W)/\cos \theta max$$

where $\Delta W = \delta/\tan \eta$.

20. The magnetic recording and reproducing apparatus according to claim 15, wherein the inclination angle η of the trapezoidal shape of the section of each of said convex-portion perpendicular magnetic recording layers in the track width direction (track radial direction) falls within the angular range of 50 to 85 degrees.

21. The magnetic recording and reproducing apparatus according to claim 9, wherein said magnetic recording medium is the discrete medium in which said data tracks for recording the data information and said servo tracks for recording the tracking servo information are formed as the plurality of recording elements divided in the predetermined convex-concave pattern and concave portions are filled with a nonmagnetic material for causing a discrete operation to be exhibited.

* * * * *

UNITED STATES PATENT AND TRADEMARK OFFICE
CERTIFICATE OF CORRECTION

PATENT NO.         : 7,215,502 B2
APPLICATION NO. : 11/136372
DATED                  : May 8, 2007
INVENTOR(S)       : Tagami It is certified that error appears in the above-identified patent and that said Letters Patent is hereby corrected as shown below:

On the title page, Item (54), and at the beginning of column 1, the title is incorrect. Item (54) and the beginning of column 1 should read:

-- (54) MAGNETIC RECORDING AND REPRODUCING APPARATUS WITH TRAPEZOIDAL WRITE POLE TIP TO AVOID OVERWRITING ADJACENT TRACKS --

Signed and Sealed this

Third Day of July, 2007

JON W. DUDAS
*Director of the United States Patent and Trademark Office*